(12) United States Patent
Kakutani

(10) Patent No.: US 10,462,331 B2
(45) Date of Patent: Oct. 29, 2019

(54) IMAGE PROCESSING METHOD AND APPARATUS, AND PRINTING APPARATUS, WITH DITHER RESULT APPLICATION LEVEL CONTROL

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/246,585

(22) Filed: Jan. 14, 2019

(65) Prior Publication Data

US 2019/0220714 A1 Jul. 18, 2019

(30) Foreign Application Priority Data

Jan. 16, 2018 (JP) ................ 2018-004692

(51) Int. Cl.
*H04N 1/405* (2006.01)
*G06K 15/02* (2006.01)
(Continued)

(52) U.S. Cl.
CPC ....... *H04N 1/4053* (2013.01); *G06K 15/1877* (2013.01); *G06K 15/1881* (2013.01);
(Continued)

(58) Field of Classification Search
CPC .. H04N 1/40062; H04N 1/409; H04N 1/4092; H04N 1/405–4058; H04N 1/52; H04N 1/58; H04N 1/6027; G06K 15/1872; G06K 15/1873; G06K 15/1874; G06K 15/1876; G06K 15/1877; G06K 15/1881; G06K 9/00442; G06K 9/00456

See application file for complete search history.

(56) References Cited

U.S. PATENT DOCUMENTS

| 5,471,543 A * | 11/1995 | Ng ................ H04N 1/4058 358/3.14 |
| 5,553,166 A | 9/1996 | Kakutani |

(Continued)

FOREIGN PATENT DOCUMENTS

| JP | 3360391 B2 | 12/2002 |
| JP | 2005-041041 A | 2/2005 |

(Continued)

*Primary Examiner* — Scott A Rogers

(57) ABSTRACT

An image processing apparatus that prints an image includes a preliminary halftone processing unit configured to determine whether a preliminary dot through a dithering method is to be formed, a final halftone processing unit configured to determine whether a dot to be printed through an error diffusion method is to be formed, and a dither result application level control unit configured to control a dither result application level which is a level at which probability that the dot to be printed will be formed is raised with the final halftone processing unit when the preliminary dot is to be formed in the preliminary halftone processing unit. The dither result application level control unit reduces the dither result application level during printing in a case of copying a reflected document or a case where the image data contains many high-frequency components, compared to other instances of printing.

20 Claims, 15 Drawing Sheets

(51) Int. Cl.
  *H04N 1/52* (2006.01)
  *H04N 1/58* (2006.01)
  *H04N 1/409* (2006.01)

(52) U.S. Cl.
  CPC ............ *H04N 1/409* (2013.01); *H04N 1/52* (2013.01); *H04N 1/58* (2013.01)

(56) References Cited

U.S. PATENT DOCUMENTS

| | | | |
|---|---|---|---|
| 5,764,811 A | 6/1998 | Kakutani | |
| 6,178,011 B1* | 1/2001 | Lin | H04N 1/4055 |
| | | | 358/1.9 |
| 6,271,936 B1* | 8/2001 | Yu | H04N 1/40087 |
| | | | 358/3.04 |
| 6,643,031 B1* | 11/2003 | Takano | H04N 1/4056 |
| | | | 358/1.9 |
| 7,620,255 B2* | 11/2009 | Kobayashi | H04N 1/4053 |
| | | | 382/237 |
| 8,416,457 B2* | 4/2013 | Kakutani | H04N 1/4053 |
| | | | 358/3.03 |
| 8,681,378 B2* | 3/2014 | Kakutani | H04N 1/4092 |
| | | | 358/1.9 |
| 8,705,128 B2* | 4/2014 | Kakutani | H04N 1/4051 |
| | | | 358/1.9 |
| 9,148,547 B2* | 9/2015 | Kakutani | H04N 1/4053 |
| 9,247,104 B2* | 1/2016 | Kakutani | H04N 1/405 |
| 9,349,083 B2* | 5/2016 | Kikuta | G06K 15/1881 |
| 2006/0193010 A1 | 8/2006 | Kakutani | |
| 2008/0259361 A1* | 10/2008 | Kakutani | H04N 1/4052 |
| | | | 358/1.8 |
| 2011/0063684 A1 | 3/2011 | Kakutani | |
| 2011/0141527 A1 | 6/2011 | Kakutani | |
| 2012/0243012 A1 | 9/2012 | Kakutani | |
| 2012/0243013 A1 | 9/2012 | Kakutani | |
| 2013/0120769 A1 | 5/2013 | Kakutani | |
| 2014/0218431 A1 | 8/2014 | Kakutani | |
| 2014/0268241 A1 | 9/2014 | Kakutani et al. | |
| 2014/0362416 A1 | 12/2014 | Kakutani | |
| 2015/0256714 A1 | 9/2015 | Yamazaki | |
| 2016/0295077 A1 | 10/2016 | Kakutani | |
| 2017/0034393 A1 | 2/2017 | Hasegawa et al. | |

FOREIGN PATENT DOCUMENTS

| | | |
|---|---|---|
| JP | 2007-015359 A | 1/2007 |
| JP | 2010-028786 A | 2/2010 |
| JP | 2011-015241 A | 1/2011 |
| JP | 2011-066594 A | 3/2011 |
| JP | 5045790 B2 | 10/2012 |
| JP | 2013-103437 A | 5/2013 |
| JP | 5504858 B2 | 5/2014 |
| JP | 2014-236460 A | 12/2014 |
| JP | 5750968 B2 | 7/2015 |
| JP | 5750969 B2 | 7/2015 |
| JP | 2015-167306 A | 9/2015 |
| JP | 2016-163080 A | 9/2016 |
| JP | 2016-197827 A | 11/2016 |
| JP | 6040522 B2 | 12/2016 |
| JP | 2017-030149 A | 2/2017 |
| JP | 6119322 B2 | 4/2017 |

* cited by examiner

IMAGE PROCESSING METHOD AND APPARATUS, AND PRINTING APPARATUS, WITH DITHER RESULT APPLICATION LEVEL CONTROL

BACKGROUND

1. Technical Field

The invention relates to an image processing apparatus, a method of controlling an image processing apparatus, and a printing apparatus pertaining to a halftone processing technique used in a technique for processing an image using image data and a technique for printing an image.

2. Related Art

In printing apparatuses, an ordered dithering method, an error diffusion method, and the like are widely used as halftone techniques for expressing gradations. The error diffusion method and a dithering method with blue noise mask characteristics are mainly used in ink jet printers in particular. When there is no skew in the landing positions of dots, the error diffusion method is better than the dithering method with blue noise mask characteristics in terms of graininess, and has superior reproduction of fine lines at low densities (that is, low dot densities) due to threshold optimization. Error diffusion has a further advantage over the dithering method with blue noise mask characteristics in that there is less worsening in the graininess when the image data contains mid- and high-frequency components. However, a normal error diffusion method has a problem in that positional skew between multiple nozzle rows in the printing apparatus, skew in landing positions produced when multiple scans are combined, and the like result in a significant worsening in graininess.

According to the technique of JP-A-2013-103437, a dot-dispersion dithering method in which the dots are distributed irregularly, as exemplified by the dithering method with blue noise mask characteristics, enables characteristics that suppress a worsening in the graininess, fluctuations in density, and the like caused by landing position skew during printing to be incorporated into the process of creating the dither mask. This provides an advantage in that the technique is more robust with respect to landing position skew. On the other hand, there are problems in that low-density fine lines break or disappear more easily, the graininess worsens significantly when the image data contains mid- and high-frequency components, and the like.

Accordingly, JP-A-2011-066594 proposes a method that, by combining both the stated methods, makes it possible to set the degree to which the methods are applied as desired in accordance with input gradation values, such that the error diffusion method is used primarily in low-density areas, the dithering method is used primarily in high-density areas, and the degree to which the methods are applied changes gradually in intermediate areas. With this method, however, the graininess worsens slightly in areas of transition from where the error diffusion method is primarily used to where the dithering method is primarily used, which is problematic when handling image data having high photographic quality.

In response, JP-A-2014-236460 proposes a method that eliminates worsening of graininess in areas of transition from the error diffusion method to the dithering method by processing the majority of gradation regions with the dithering method and applying the error diffusion method only to edge parts of low-density line images and the like. Although this method successfully reproduces low-density fine lines, the inability to prevent a worsening in graininess when the data contains mid- and high-frequency components remains as an issue.

Such worsening in graininess when the image data contains mid- and high-frequency components is a major problem when creating a reproduction by copying from a reflected document. This is because with the exception of silver halide photography, gravure printing, and the like, most reflected documents are printed by output devices that reproduce gradations through area gradation rather than density gradation. With offset printing, for example, an area that when viewed from a distance lacks high-frequency components and appears as a uniform color has, when viewed up close, a structure that switches between white background areas and ink-colored halftone dot areas at a short cycle, and mid- to high-frequency spatial frequency components that are not present in the original image data occur. Outputs from electrophotographic printers often have similar halftone structures. Furthermore, the output of an ink jet printer has dots arranged discretely in units of single dots, which produces frequency components even higher than with halftone dots. In a case where such outputs are used as the input documents for copying a reflected document, the input data will contain many high-frequency components. Negative effects caused by the high-frequency components in the input data will be relatively low with the error diffusion method, but when using the dithering method with a blue noise mask or the like, the effects of the high-frequency components in the input data will disturb the original blue noise characteristics of the blue noise mask. There is thus a problem in that the printed image that is the output result will contain noise in the mid- and low-frequency components, causing a major worsening in graininess.

SUMMARY

An advantage of some aspects of the invention is to solve at least some of the above-described issues, and the invention can be realized as the following aspects or application examples.

Application Example 1

An image processing apparatus according to this application example is an image processing apparatus configured to print an image, the image processing apparatus including a preliminary halftone processing unit configured to determine whether a preliminary dot through a dithering method is to be formed on the basis of a data gradation value in image data, a final halftone processing unit configured to determine whether a dot to be printed through an error diffusion method is to be formed on the basis of the data gradation value, and a dither result application level control unit configured to control a dither result application level, the dither result application level being a level at which probability that the dot to be printed will be formed is raised when the preliminary dot is to be formed. The final halftone processing unit applies the dither result application level, and the dither result application level control unit reduces the dither result application level during printing in a case where copy data from a reflected document is used as the image data or a case where the image data contains many high-frequency components, compared to other instances of printing.

According to this application example, when using copy data from a reflected document, or when printing image data having a large amount of high-frequency components, e.g., image data using a document printed by an ink jet printer as an input document, the halftoning is carried out with a reduced level of application of the dithering method and an increased level of application of the error diffusion method, which suppresses a worsening in graininess caused by high-frequency component noise. On the other hand, when printing high-quality image data having fewer high-frequency components, halftoning having an increased level of application of the dithering method, which incorporates characteristics robust with respect to skew in landing positions (JP-A-2013-103437), is carried out, and thus a worsening in the graininess is suppressed. As such, a worsening in the graininess during printing can be suppressed in accordance with the characteristics of the image data of the input document.

When generating dot data through the error diffusion method, the image processing apparatus including this configuration controls the ease with which dots are formed through the error diffusion method by using a result of comparing a dithering method threshold with the data gradation value of the image data. In other words, the ease with which dots are formed through the error diffusion method is controlled by using the result of determining whether a dot is formed based on an assumption that the dithering method is used. As such, a halftone processing that incorporates the dithering method-type elements and the error diffusion method-type elements is possible.

Application Example 2

In the image processing apparatus according to the above-described application example, the dither result application level control unit includes a mechanism of using a lower error diffusion method threshold, used in the error diffusion method when the preliminary dot is to be formed than when the preliminary dot is not to be formed, and reduces the dither result application level by reducing a difference between the error diffusion method threshold used in the case where the preliminary dot is to be formed, and the error diffusion method threshold used in the case where the preliminary dot is not to be formed.

According to this application example, the data gradation value of the image data is compared with a dithering method threshold, and by setting the error diffusion method threshold used in the error diffusion method to be lower when it is determined that a preliminary dot is to be formed than when it is determined that a preliminary dot is not to be formed, control can be carried out so that the dot to be printed is formed more easily. Additionally, by setting the error diffusion method threshold used in the error diffusion method to be higher when it is determined that a preliminary dot is not to be formed using the dithering method than when it is determined that a preliminary dot is to be formed, control can be carried out so that the dot to be printed is formed less easily. Furthermore, the dither result application level can be reduced and the level of application of the error diffusion method can be increased by reducing a difference between the error diffusion method threshold used when it has been determined that a preliminary dot is formed and the error diffusion method threshold used when it is determined that a preliminary dot is not formed. As such, a worsening in the graininess during printing can be suppressed in accordance with the characteristics of the image data of the input document.

Application Example 3

In the image processing apparatus according to the above-described application example, the dither result application level control unit, in a case where the dither result application level is set to a maximum, sets a pixel, in which the preliminary dot is to be formed, to be formed with the dot to be printed with the final halftone processing unit.

This application example is equivalent with setting, in Application Example 2, the error diffusion method threshold, used when a preliminary dot is determined to be formed, to an extremely low value of $-\infty$ to set the dither result application level to a maximum.

According to this application example, when the data gradation value is greater than the dithering method threshold, it is determined that the dot to be printed is formed as-is even in the error diffusion method, whereas when the data gradation value is not greater than the dithering method threshold, it is determined that a dot will be formed according to the determination in the error diffusion method, and the dot data to be printed is generated. Accordingly, the ratio of dots determined to be formed through determinations using the dithering method threshold increases, which makes it possible to form dots in accordance with the characteristics of a dither mask. Thus, when the characteristics of the dither mask are to be exploited, halftoning with a high dither result application level, which for example incorporates characteristics robust with respect to skew in landing positions, is carried out, which makes it possible to suppress a worsening in the graininess during printing.

Application Example 4

In the image processing apparatus according to the above-described application example, the dither result application level control unit controls a percentage of the preliminary dots to be formed, and when the dither result application level is reduced, reduces a percentage of pixels determined, by the preliminary halftone processing unit, to have the preliminary dot to be formed.

According to this application example, when reducing the dither result application level using a mechanism for controlling the ratio of preliminary dot formations that are to be formed, the set value may be a set value obtained by multiplying the data gradation value of the image data by a predetermined coefficient. In a case where the data gradation value is associated with a value lower than the original data gradation value, the ratio of dots determined to be formed through a determination using the dithering method threshold can be reduced, and those dots can instead be formed through the error diffusion method, and in a case where the data gradation value is brought closer to the original data gradation value, the ratio of dots determined to be formed through a determination using the dithering method threshold can be increased, and those dots can be formed in accordance with the characteristics of the dither mask. Which of these states is strengthened can be adjusted with ease. Accordingly, the ratio of dots formed through the dithering method and the ratio of dots formed through the error diffusion method can be adjusted with a high level of freedom. For example, in a case where the data gradation value is set to be lower than the original data gradation value, dots required for fine lines, edges, and the like can be supplemented through the error diffusion method. On the other hand, in a case where the data gradation value is set to be closer to the original data gradation value, dot formation that exploits the characteristics of the dither mask can be carried out. Thus when the characteristics of the dither mask are to be exploited, halftoning with a high dither result application level, using a dither mask that for example incorporates characteristics robust with respect to skew in landing positions, is carried out, which makes it possible to suppress a worsening in the graininess during printing.

Additionally, when reducing the dither result application level using a mechanism for controlling the ratio of preliminary dot formations that are to be formed, the set value may be a set value obtained by multiplying the dithering method threshold by a predetermined coefficient. In a case where the dither threshold is associated with a value greater than the original dither threshold, the ratio of dots determined to be formed through a determination using the dithering method threshold can be reduced, and those dots can instead be formed through the error diffusion method, and in a case where the dither threshold is brought closer to the original dither threshold, the ratio of dots determined to be formed through a determination using the dithering method threshold can be increased, and those dots can be formed in accordance with the characteristics of the dither mask. Which of these states is strengthened can be adjusted with ease. Accordingly, the ratio of dots formed through the dithering method and the ratio of dots formed through the error diffusion method can be adjusted with a high level of freedom. For example, in a case where the dither threshold is set to be greater than the original dither threshold, dots required for fine lines, edges, and the like can be supplemented through the error diffusion method. On the other hand, in a case where the dither threshold is set to be closer to the original dither threshold, dot formation that exploits the characteristics of the dither mask can be carried out. Thus, when the characteristics of the dither mask are to be exploited, halftoning with a high dither result application level, using a dither mask that for example incorporates characteristics robust with respect to skew in landing positions, is carried out, which makes it possible to suppress a worsening in the graininess during printing.

Application Example 5

In the image processing apparatus according to the above-described application example, the final halftone processing unit applies the error diffusion method using a low-level threshold, the low-level threshold being the error diffusion method threshold in the case where the preliminary dot is to be formed, for a pixel in which the preliminary dot is to be formed with the preliminary halftone processing unit, and using a high-level threshold, the high-level threshold being the error diffusion method threshold in the case where the preliminary dot is not to be formed, for a pixel in which the preliminary dot is not to be formed with the preliminary halftone processing unit.

According to this application example, when it is determined that a dot is to be formed by comparing the dithering method threshold with the data gradation value, the low-level threshold, which is the error diffusion method threshold, can be controlled so that the dot is formed more easily through the error diffusion method, and when it is determined that a dot is not to be formed using the dithering method, the high-level threshold, which is the error diffusion method threshold, can be controlled so that the dot is formed less easily through the error diffusion method. With either control, as compared to dot data simply obtained through the error diffusion method, whether a dot to be printed is formed can be brought closed to the result of the dithering method, which increases the level of application of dithering method-type elements in the halftone processing. Therefore, a halftone processing that incorporates dithering method-type elements and error diffusion method-type elements is thus possible, and a worsening in the graininess during printing can be suppressed by controlling the level of application of the dithering method-type elements in accordance with the image data.

Application Example 6

In the image processing apparatus according to the above-described application example, the dither result application level control unit includes a high-frequency component determination unit configured to determine an amount of high-frequency components in the image data, and in the case where the high-frequency component determination unit has determined that an amount of the high-frequency components in the image data is greater than or equal to a set amount, the dither result application level is reduced compared to cases where a different determination is made.

According to this application example, when the high-frequency component determination unit, which determines the amount of high-frequency components in the image data, has determined that the high-frequency components are greater than or equal to a set amount, a halftone processing in which the dither result application level is reduced, and the level of application of the error diffusion method is increased by that amount, is possible. Accordingly, in the case of image data having many high-frequency components, e.g., image data using a document printed by an ink jet printer as the input document, halftoning having a high level of application of the error diffusion method is carried out, and thus a worsening in the graininess during printing is suppressed. When it is determined that the high-frequency components are less than the set amount, halftoning can be carried out with the dither result application level set higher than when the high-frequency components are determined to be greater than or equal to the set amount. As such, halftoning having a high level of application of the dithering method, which incorporates characteristics robust with respect to skew in landing positions, is carried out when printing high-quality image data that does not contain as many high-frequency components, and thus a worsening in the graininess during printing is suppressed. Thus a printed output in which a worsening in the graininess during printing is suppressed in accordance with the characteristics of the image data of the input document is obtained in either case.

Application Example 7

In the image processing apparatus according to the above-described application example, the low-level threshold of the error diffusion method threshold, during printing that is neither a case where copy data from a reflected document is used as the image data nor a case where the image data contains many high-frequency components, is a value lower than a minimum value of a gradation range of the data gradation value in all gradation ranges of the data gradation value, or a pixel in which the preliminary dot is to be formed is set to be formed with the dot to be printed with the final halftone processing unit.

According to this application example, the low-level threshold for the error diffusion method threshold is set to a value lower than the gradation range of the data gradation value in all gradation ranges of the data gradation value. Thus, when the dithering method threshold is compared to the data gradation value and the data gradation value is determined to be greater than the dithering method threshold, it is extremely likely that the error diffusion result will be applied as-is. Accordingly, when the required number of dots are produced as a result of the comparison in the dithering method, it is rare for a dot to be produced according to a determination in the error diffusion method, even if a value close to the threshold used in normal error diffusion method is set for the high-level threshold. As such, an output substantially compatible with dithering is obtained. For example, halftoning with a high dither result application level, using a dither mask that for example incorporates characteristics robust with respect to skew in landing positions, is carried out, which makes it possible to suppress a worsening in the graininess during printing.

Application Example 8

In the image processing apparatus according to the above-described application example, the low-level threshold of the error diffusion method threshold, during printing in a case where copy data from a reflected document is used as the image data or a case where the image data contains many high-frequency components, is the same value as the high-level threshold when the data gradation value is less than a predetermined value, and is a lower value than the high-level threshold when the data gradation value is greater than or equal to the predetermined value.

According to this application example, the dithering method threshold is compared with the data gradation value, and when data gradation value is determined to be greater than the dithering method threshold, the likelihood that the result of the determination in the dithering method will be the same as the result of error diffusion is set to be higher for high-gradation data in which the data gradation value is greater than or equal to a predetermined value than for low-gradation data. This makes it possible to make the dithering method-type elements stronger on the high-gradation side than on the low-gradation side. When the data gradation value is less than the predetermined value, the low-level threshold has the same value as the high-level threshold, and thus the advantages provided by error diffusion method-type elements can be achieved on the low-gradation side while achieving the advantages provided by dithering method-type elements on the high-gradation side. In other words, printing that exploits the advantages of both the error diffusion method and the dithering method is possible. Accordingly, a worsening in graininess caused by skew in landing positions can be suppressed while suppressing a worsening in graininess in cases where there is no skew in the landing positions, cases where high-frequency component noise is present in the image data, and the like.

Application Example 9

A method of controlling an image processing apparatus according to this application example is a method of controlling an image processing apparatus to print an image, by using a computer, the method including carrying out a preliminary halftone processing of determining whether a preliminary dot through a dithering method is to be formed on the basis of a data gradation value in image data, carrying out a final halftone processing of determining whether a dot to be printed through an error diffusion method is to be formed on the basis of the data gradation value, and controlling a dither result application level, the dither result application level being a level at which probability that the dot to be printed will be formed is raised when the preliminary dot is to be formed. The final halftone processing applies the dither result application level, and the dither result application level control unit reduces the dither result application level during printing in a case where copy data from a reflected document is used as the image data or a case where the image data contains many high-frequency components, compared to other instances of printing.

According to this application example, when using copy data from a reflected document as the image data, or when printing image data having a large amount of high-frequency components, e.g., image data using a document printed by an ink jet printer as an input document, the halftoning is carried out with a reduced level of application of the dithering method and a level of application of the error diffusion method increased by that amount, which suppresses a worsening in graininess during printing. Thus, like the image processing apparatus according to Application Example 1, a printed output in which a worsening in the graininess during printing is suppressed in accordance with the characteristics of the image of the input document is obtained in either case.

Application Example 10

A printing apparatus according to this application example is a printing apparatus including a printing mode for printing an image and a reflective document copying mode for copying a reflected document, the printing apparatus including a preliminary halftone processing unit configured to determine whether a preliminary dot through a dithering method is to be formed on the basis of a data gradation value in image data, a final halftone processing unit configured to determine whether a dot to be printed through an error diffusion method is to be formed, based on the data gradation value, and a dither result application level control unit configured to control a dither result application level, the dither result application level being a level at which probability that the dot to be printed will be formed is raised when the preliminary dot is to be formed. The final halftone processing unit applies the dither result application level, and the dither result application level control unit reduces the dither result application level during printing in the case of the reflective copying mode, compared to other instances of printing.

According to this application example, the reflective copying mode is assumed to correspond to a case of image data when a document having a large amount of high-frequency components, which has been printed by an ink jet printer, is used as an input document. Here, halftoning having a high level of application of the error diffusion method is carried out, and thus a worsening in the graininess during printing is suppressed. The printing mode is assumed to correspond to a case of high-quality image data that does not contain as many high-frequency components. Here, halftoning having a high level of application of the dithering method, which incorporates characteristics robust with respect to skew in the landing positions, is carried out, and thus a worsening in the graininess during printing is suppressed. Accordingly, a printed output in which a worsening in the graininess during printing is suppressed is obtained in accordance with the mode used during printing.

The printing apparatus having this configuration can provide a halftone processing for obtaining a printed output in which a worsening in image quality is suppressed when printing in each of a printing mode for printing images and a reflective copying mode for copying a reflected document, in a printing apparatus having a plurality of functions such as a printing function, a function for copying a reflected document, a scanning function, and the like, as exemplified by an ink jet printer multifunction peripheral.

A case where the image data has many high-frequency components may correspond to the reflective copying mode, and other cases may correspond to the printing mode, as per Application Example 1 described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Exemplary Embodiment

A first exemplary embodiment of the invention will be described.

Figure 1:
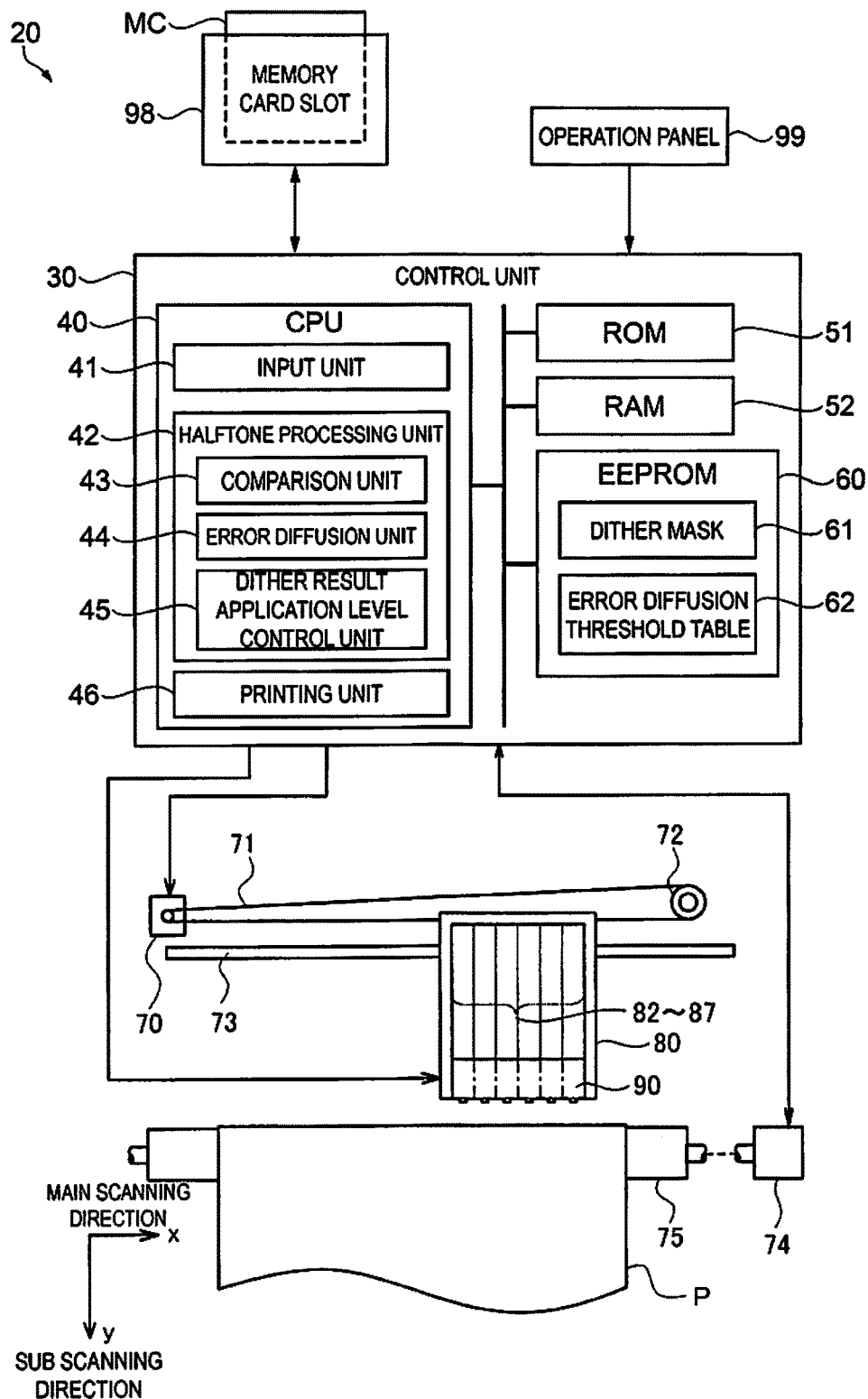
FIG. 1 is a diagram illustrating the overall configuration of a printer 20 according to the invention.

A-1. Apparatus Configuration:

FIG. 1 is a diagram illustrating the overall configuration of a printer 20 serving as a first exemplary embodiment of an image processing apparatus according to the invention. The printer 20 is a serial-type ink jet printer that carries out bidirectional printing. As illustrated in FIG. 1, the printer 20 is constituted by a mechanism that transports a printing medium P using a paper feed motor 74, a mechanism that moves a carriage 80 back and forth along the axial direction of a platen 75 using a carriage motor 70, a mechanism that ejects ink and forms dots by driving a printing head 90 mounted on the carriage 80, and a control unit 30 that controls the exchange of signals among the paper feed motor 74, the carriage motor 70, the printing head 90, and an operation panel 99.

The mechanism that moves the carriage 80 back and forth along the axial direction of the platen 75 is constituted by a sliding shaft 73 that is arranged parallel to the axis of the platen 75 and that holds the carriage 80 being capable of sliding, a pulley 72 that holds an endless driving belt 71 between the pulley 72 and the carriage motor 70, and the like.

The carriage 80 includes ink cartridges 82 to 87 for color ink, the ink cartridges 82 to 87 holding cyan ink C, magenta ink M, yellow ink Y, black ink K, light cyan ink Lc, and light magenta ink Lm, respectively, as color inks. Nozzle rows corresponding to the respective colors of the above-described color inks are formed in the printing head 90, which is located in a lower part of the carriage 80. When the ink cartridges 82 to 87 are equipped in the carriage 80, ink can be supplied to the printing head 90 from the cartridges.

The control unit 30 is constituted by a CPU 40, ROM 51, RAM 52, EEPROM 60, and the like connected to each other by a bus. The control unit 30 controls the overall operations of the printer 20, and also functions as an input unit 41, a halftone processing unit 42, and a printing unit 46, by loading programs stored in the ROM 51, the EEPROM 60, and the like into the RAM 52 and executing the programs. The functions of the halftone processing unit 42 include the functions as a comparison unit 43, which corresponds to a preliminary halftone processing unit that determines whether preliminary dots are formed through a dithering method, an error diffusion unit 44, which corresponds to a final halftone processing unit that determines whether dots to be printed are formed through error diffusion method, and a dither result application level control unit 45 that controls the application level of a dither result. These function units will be described in detail later.

Figure 6:
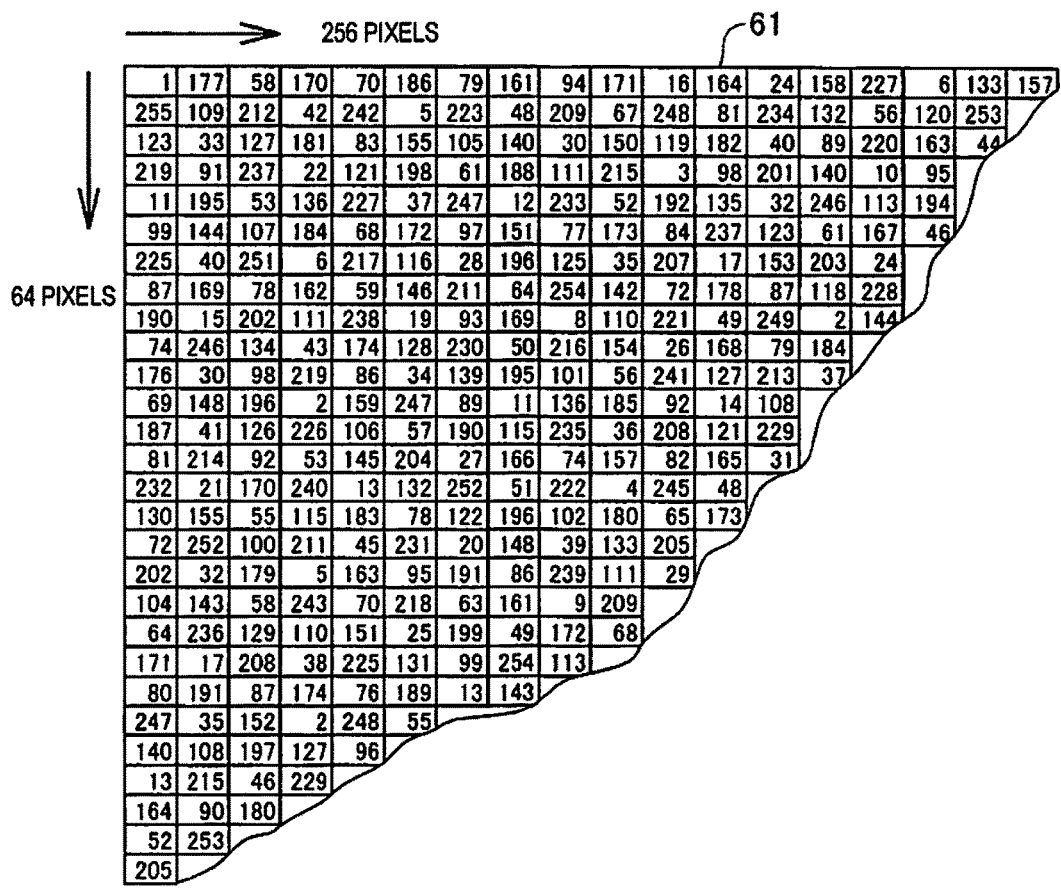
FIG. 6 is a diagram illustrating an example of a dither mask 61.

The EEPROM 60 stores a dither mask 61 and an error diffusion threshold table 62. The dither mask 61 is used in a halftone processing, which will be described later. FIG. 6 illustrates an example of part of the dither mask 61, where assuming that the arrow pointing to the right indicates a main scanning direction of the printing head and the arrow pointing downward indicates a sub scanning direction, the dither mask 61 has a size of 256 on the horizontal (the main scanning direction)×64 on the vertical (the sub scanning direction). Dithering method thresholds THn_d are arranged in the dither mask 61. The dithering method thresholds THn_d (also called simply "thresholds THn_d" hereinafter) take on values from 1 to 255 in this embodiment. The thresholds THn_d are arranged so that the spatial frequency of dots formed by comparisons with those thresholds has what is known as blue noise characteristics.

Figure 7:
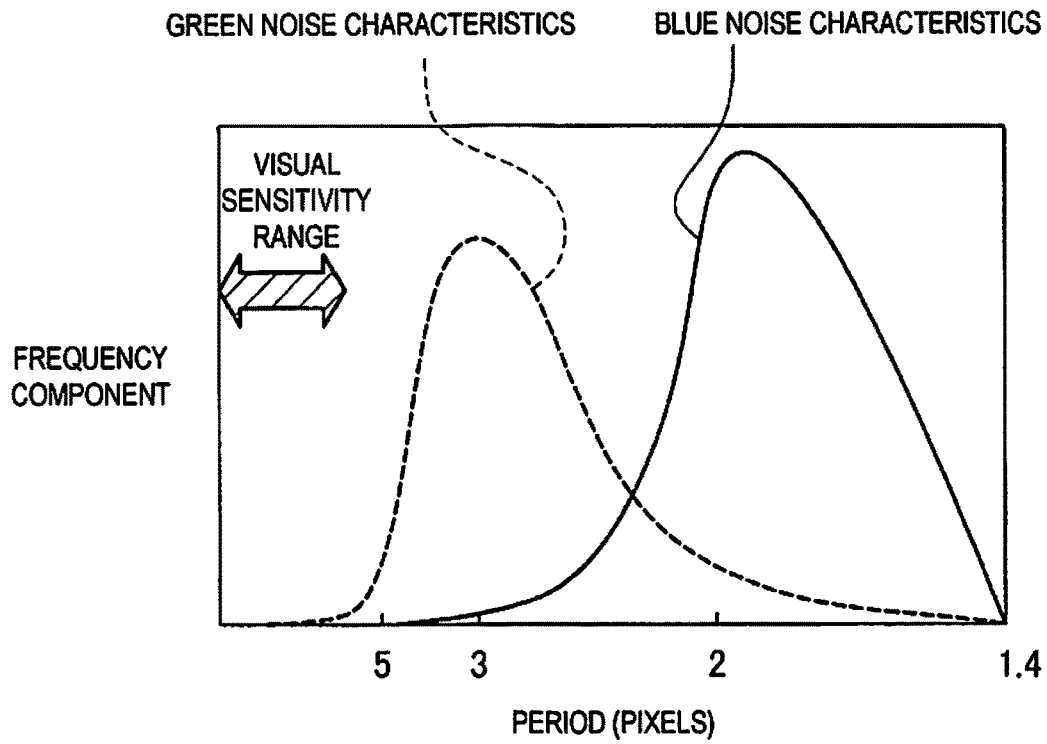
FIG. 7 is a diagram illustrating an example of noise characteristics of the dither mask 61.

FIG. 7 is a diagram illustrating an example of the noise characteristics of the dither mask 61. FIG. 7 conceptually illustrates an example of the spatial frequency characteristics of the thresholds set for each of pixels in a dither mask having blue noise characteristics and green noise characteristics. The blue noise characteristics in the dither mask have the greatest frequency component in a high-frequency range where the length of a single period is near two pixels. This means that, in light of the characteristics of human vision, which has a low sensitivity to high-frequency ranges, the positions where the thresholds are held are adjusted so that the greatest frequency component is produced in a high-frequency range. An image having superior dot dispersiveness is obtained when dots are produced using a dither mask having such blue noise characteristics.

FIG. 7 further indicates an example of the green noise characteristics as a broken line curve. As illustrated in FIG. 7, the green noise characteristics have the greatest frequency component at a slightly lower frequency than the blue noise characteristics, and thus as long as the pixel size is sufficiently small, a favorable image that does not impart a sense of graininess is obtained even with the green noise characteristics. The dither mask 61 thus has predetermined spatial frequency characteristics such as these blue noise characteristics, green noise characteristics, and the like.

Furthermore, in this embodiment, the dither mask 61 has predetermined dot formation characteristics. In other words, a dot pattern of a dot group formed when the carriage 80 is outbound in the bidirectional printing, a dot pattern of a dot group formed when the carriage 80 is inbound, and a dot pattern of an overall dot group combining the aforementioned groups, all have blue noise characteristics. This technique is disclosed in JP-A-2013-103437, JP-A-2007-015359, and the like, for example. Rather than, or in addition to, the above-described groups for the outbound and inbound movements, the dither mask 61 may include blue noise characteristics for each of main scan groups, which indicate the main scan, among a plurality of main scans made by the carriage 80, in which dots are formed.

Note that the dots formed have a good dispersiveness when the spatial frequency of the dots has blue noise characteristics, green noise characteristics, or the like. Alternatively, the dot dispersiveness can be determined to be good when each of spatial frequency distributions of the threshold in the dither mask set for the pixels belonging to each of a plurality of groups, and a spatial frequency distribution of the printed image, have mutually positive correlation coefficients, and preferably have correlation coefficients of 0.7 or higher. (See Japanese Patent No. 5045790, paragraphs 0030 to 0038).

The error diffusion threshold table 62 stored in the EEPROM 60 is a table storing error diffusion method thresholds used to determine whether a dot is "ON" or "OFF" in the error diffusion method. "Whether a dot is 'ON' or 'OFF' in the error diffusion method" is equivalent in meaning to whether a printed dot is formed. In this embodiment, the error diffusion method thresholds include a low-level threshold THe_L and a high-level threshold THe_H, which have different values. The values and roles of the error diffusion method thresholds will be described in detail later.

A memory card slot 98 is connected to the control unit 30, and image data ORG can be read and input from a memory card MC inserted into the memory card slot 98. In this embodiment, the image data ORG input from the memory card MC is color image data constituted by three color components, namely red (R), green (G), and blue (B).

The printer 20 having a hardware configuration such as that described above causes the printing head 90 to move back and forth in the main scanning direction relative to the printing medium P by actuating the carriage motor 70, and causes the printing medium P to move in the sub scanning direction by actuating the paper feed motor 74. By actuating the nozzles at appropriate timings on the basis of print data as the carriage 80 moves back and forth (main scanning) and the printing medium P is fed (sub scanning), the control unit 30 forms ink dots of the appropriate color in the appropriate positions on the printing medium P. By doing so, the printer 20 can print the image data ORG, which is a color image input from the memory card MC, onto the printing medium P.

Figure 2:
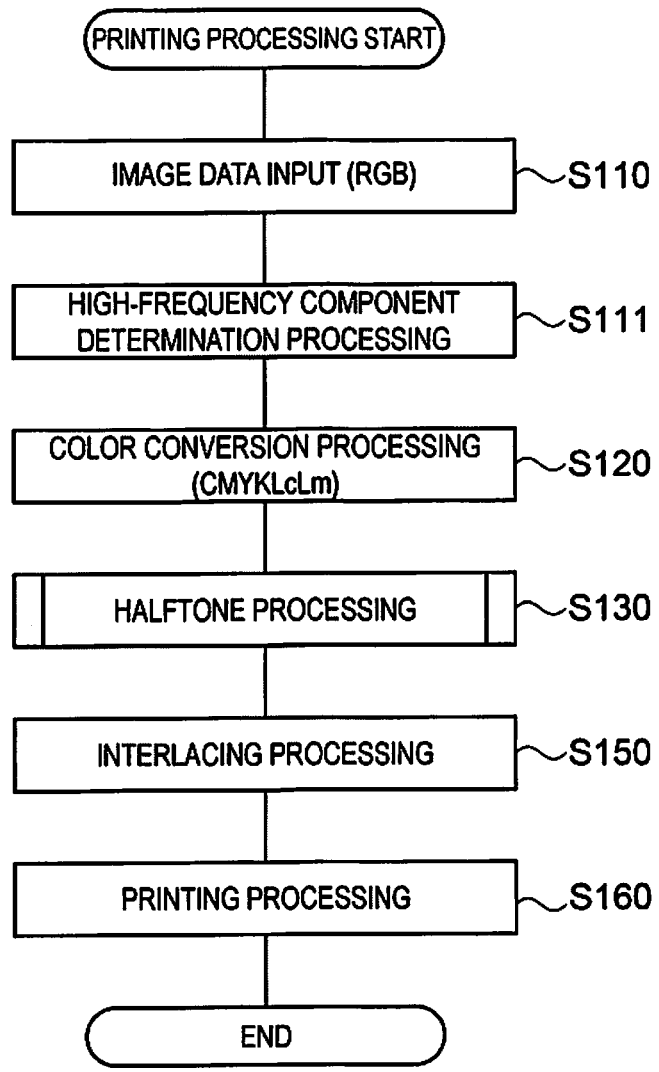
FIG. 2 is a flowchart illustrating the flow of a printing processing according to a first exemplary embodiment.

A-2. Printing Processing:

The printing processing carried out by the printer 20 will be described. FIG. 2 is a flowchart illustrating the flow of the printing processing carried out by the printer 20. Here, the printing processing is started when a user uses the operation panel 99 or the like to make an operation instructing a predetermined image stored in the memory card MC to be printed. When the printing processing is started, first, as a processing of the input unit 41, the CPU 40 reads and inputs the RGB-format image data ORG, which is the item to be printed, from the memory card MC through the memory card slot 98 (step S110).

Once the image data ORG is input, the CPU 40 carries out a high-frequency component determination processing (step S111). The high-frequency component determination processing will be described later.

Once the high-frequency component determination processing is carried out, the CPU 40 refers to a look-up table (not illustrated) stored in the EEPROM 60, and color-converts the image data ORG from RGB format into CMYKLcLm format (step S120).

Once the color conversion processing is carried out, the CPU 40 carries out a halftone processing for converting the image data into dot data in which whether a dot of each color is "ON" or "OFF" is set on a pixel-by-pixel basis, as a processing of the halftone processing unit 42 (step S130). This halftone processing will be described in detail later. Note that in this specification, the "halftone processing" is not limited to a binarization processing in which dots are either "ON" or "OFF", but rather refers generally to a gradation number conversion (reduction) processing including a multivalued coded processing, such as whether large and small dots are "ON" or "OFF", whether large, medium, and small dots are "ON" or "OFF", and the like. Additionally, the image data provided in step S130 may be data that has been subjected to the image processing such as resolution conversion processing, smoothing processing, or the like.

Once the halftone processing is carried out, the CPU 40 carries out an interlacing processing that rearranges the dot pattern data to be printed in each instance of main scanning, in accordance with the nozzle arrangement, paper feed amount, and the like of the printer 20 (step S150). Once the interlacing processing is carried out, the CPU 40 actuates the printing head 90, the carriage motor 70, the paper feed motor 74, and the like to execute the print, as a processing of the printing unit 46 (step S160).

Figure 3:
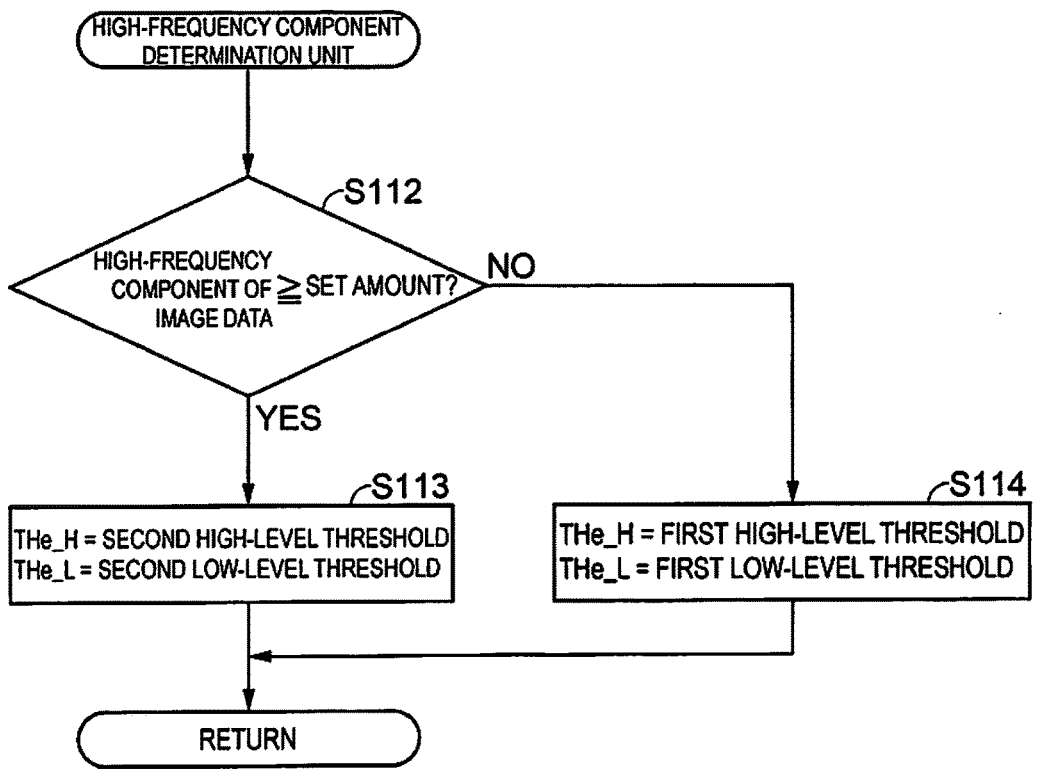
FIG. 3 is a flowchart for a high-frequency component determination unit according to the first exemplary embodiment.

A-3. Details of High-Frequency Component Determination Processing:

The aforementioned high-frequency component determination processing (step S111) will be described in detail using FIG. 3. As illustrated in FIG. 3, when the RGB-format image data ORG is read and input as the item to be printed in step S110, the CPU 40 determines a high-frequency component of the image data (step S112). In a case where the high-frequency component is greater than or equal to a set amount (step S112: YES), the CPU 40 substitutes the second high-level threshold for the high-level threshold THe_H and the second low-level threshold for the low-level threshold THe_L (step S113). In a case where the high-frequency component of the image data is less than the set amount (step S112: NO), the first high-level threshold is substituted for the high-level threshold THe_H and the first low-level threshold is substituted for the low-level threshold THe_L (step S114). The setting to the high-level threshold THe_H and the low-level threshold THe_L is carried out by referring to the error diffusion threshold table 62 stored in the EEPROM 60.

Figure 4A:
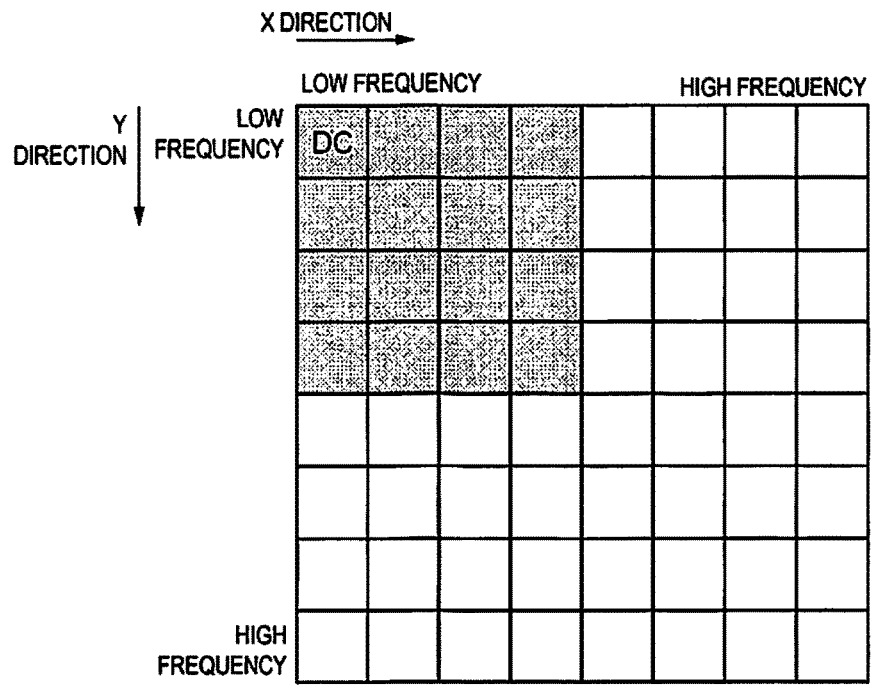
FIG. 4A is a diagram illustrating a case where there are 16 low-frequency components among frequency components in each of 8×8 pixel blocks, in a high-frequency component determination processing.
Figure 4B:
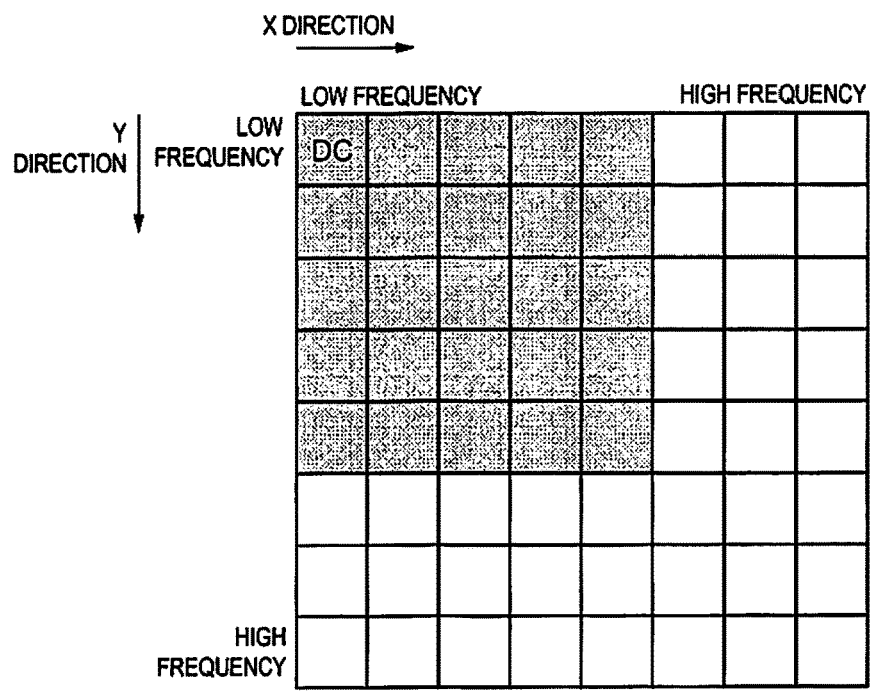
FIG. 4B is a diagram illustrating a case where there are 25 low-frequency components among frequency components in each of 8×8 pixel blocks, in a high-frequency component determination processing.

Here, as a method of determining the high-frequency component, the amount of the high-frequency component may be determined from a result of compressing the image data ORG according to the Joint Photographic Expert Group (JPEG) format. JPEG divides the image data ORG in blocks of 8 pixels×8 pixels, and carries out Discrete Cosine Transforms (DCT) in units of these blocks to convert from the spatial domain to the frequency domain. Then, in the obtained DCT coefficient, the DC component, which is a direct current component, and the AC components, which are alternating current components, are quantized independently. The DC component coefficient is then encoded as a difference value that takes the DC component coefficient from the previous block as a prediction value, whereas the AC component coefficient is subjected to run-length compression and Huffman coding. The method for determining the amount of the high-frequency component from this JPEG-compressed data will be described using FIGS. 4A and 4B. The arrow in the X direction represents the horizontal direction of the image data ORG, and the arrow in the Y direction represents the vertical direction of the image data ORG. Of the AC components in FIGS. 4A and 4B, the components on the high-frequency side are taken as the high-frequency components, and the amount of high-frequency components is determined according to a predetermined condition. FIG. 4A illustrates an example where 4×4=16 components on the low-frequency side are pre-set as low-frequency components, and the remaining 48 components are pre-set as high-frequency components, whereas FIG. 4B illustrates an example where 5×5=25 components are pre-set as low-frequency components, and the remaining 39 components are pre-set as high-frequency components. In FIG. 4A, a situation where of the 48 high-frequency components in the block, a set number or more of the components are not 0, is determined to be a situation where there is a set amount or more of the high-frequency components. Likewise, in FIG. 4B, a situation where of the 39 high-frequency components in the block, a set number or more of the components are not 0, is determined to be a situation where there is a set amount or more of the high-frequency components.

Additionally, in the above-described method, in a case where color data prior to conversion of the image data ORG to ink color data is determined to have a large amount of high-frequency components in even a single color component, all of the ink color components may be determined to have a large amount of high-frequency components, or, in a case where the compressed data is divided into luma and color difference components, the determination may be made only for the luma component, with the result thereof being applied to all of the ink color components.

Furthermore, the amount of high-frequency components may be determined using the result of employing one of a fast Fourier transform (FFT), the nearest-neighbor method, or an orthogonal transform such as an Hadamard transform, which are known techniques, to measure the frequency components in units of a plurality of pixels, such as 4 pixels×4 pixels, 8 pixels×8 pixels, or the like. Further still, the amount of high-frequency components may be determined for the image as a whole by measuring the image of the image data ORG as a whole, or the amount of high-frequency components may be determined in only a one-dimensional direction by measuring only part of the raster. The set amount may be a pre-set threshold for the average value of the high-frequency components, or a threshold for the average value of the high-frequency components may be selected or set by a user. It is assumed that the set amount of the high-frequency components is compared with a result of measuring the image data ORG through any of the above-described methods.

Figure 5:
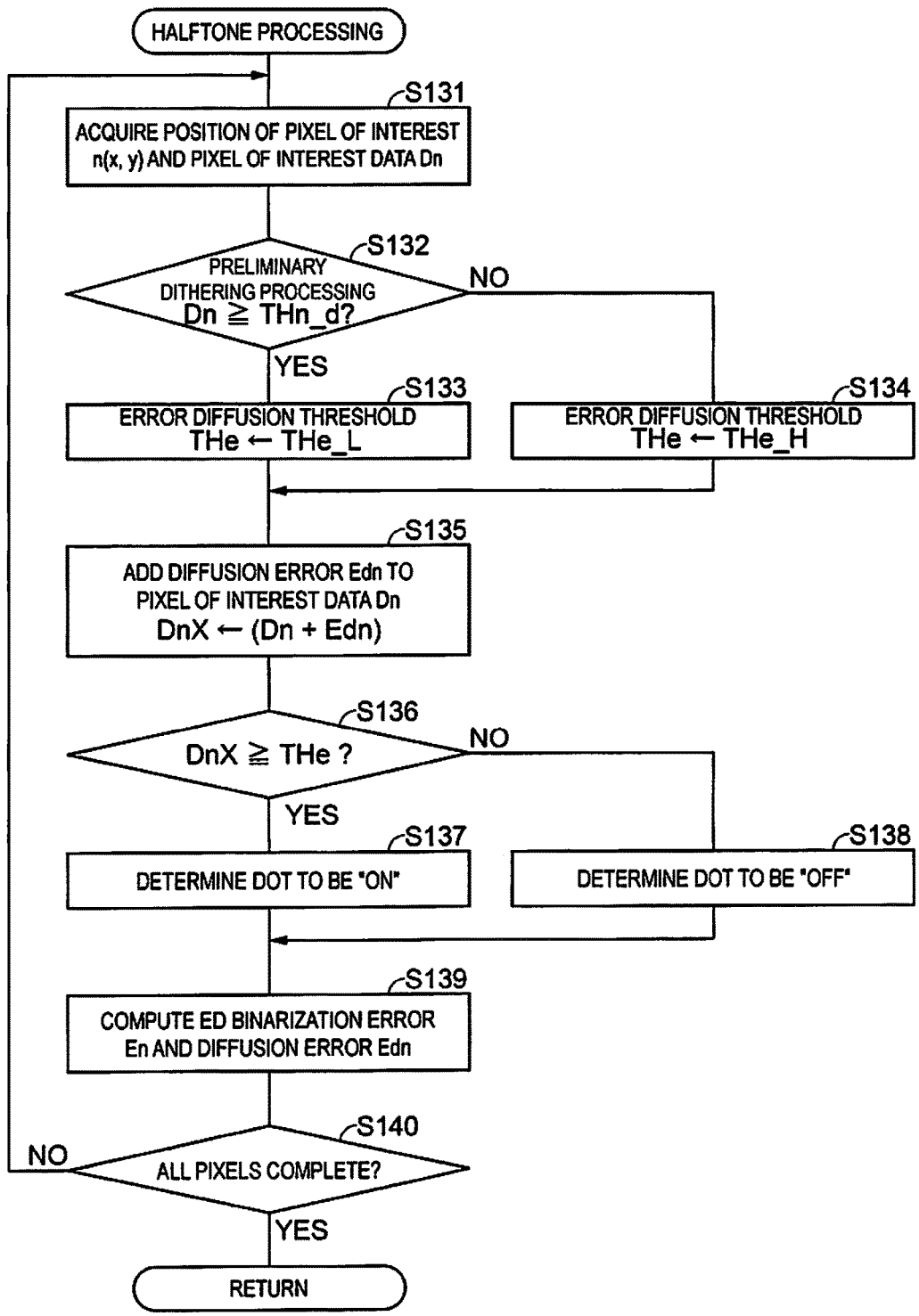
FIG. 5 is a flowchart illustrating the flow of a halftone processing according to the first exemplary embodiment.

A-4. Details of Halftone Processing:

The aforementioned halftone processing (step S130) will be described in detail using FIG. 5. As illustrated in FIG. 5, when this processing is started, first, the CPU 40 acquires coordinate data n(x, y) of the position of a pixel of interest and pixel of interest data Dn in the image data subjected to the color conversion processing in step S120 (step S131). The position of the pixel of interest starts at the origin (the upper-left) of the image, and moves one pixel at a time in the main scanning direction (the x direction) each time the following processing is repeated. Upon reaching the right end of the image in the main scanning direction, the position of the pixel of interest moves one place in the sub scanning direction (the y direction), and then moves in the main scanning direction again from the left end in the x direction. Although the following descriptions assume that the coordinate data of the position of the pixel of interest is expressed as n(x, y), when subscript indicating the position of the pixel of interest is used, the coordinate data may be written directly as (x, y).

Once the coordinate data n(x, y) of the position of the pixel of interest and the pixel of interest data Dn have been acquired, the CPU 40 carries out a preliminary dithering processing, as a processing of the comparison unit 43 (step S132). Here, the preliminary dithering processing corresponds to a processing by the preliminary halftone processing unit for determining whether a preliminary dot is formed through the dithering method, whereas the pixel of interest data Dn corresponds to a data gradation value in the image data. Although this embodiment describes an example in which the dithering method is an ordered dithering method that compares the data gradation values with thresholds set depending on the pixel position, another type of dithering method may be used. This processing compares a magnitude relationship between the data gradation value of the pixel of interest data Dn, with the value of the dithering method threshold THn_d corresponding to the coordinates (x, y) of the pixel of interest among the dithering method thresholds constituting the dither mask 61 stored in the EEPROM 60. Formally, this processing is the same as a processing of determining whether a dot is "ON" or "OFF" through the dithering method that is normally carried out. Substantially, in the normal dithering method, a dot is determined to be "ON" when the gradation value of the pixel of interest data Dn is greater than or equal to the value of the dithering method threshold THn_d, and a dot is determined to be "OFF" when the gradation value of the pixel of interest data Dn is less than the value of the threshold THn_d. However, the preliminary dithering processing according to this embodiment is different in that it is pre-processing for determining whether a dot is "ON" or "OFF" through the error diffusion method (described later), and specifically is processing for determining a threshold for the error diffusion method.

In a case where the gradation value of the pixel of interest data Dn is determined to be greater than or equal to the value of the threshold THn_d on the basis of the result of this comparison, i.e., on the basis of the result of the preliminary dithering processing which corresponds to the preliminary halftone processing unit (step S132: YES), an error diffusion method threshold THe used for the error diffusion method is set to the low-level threshold THe_L (step S133). However, in a case where the gradation value of the pixel of interest data Dn is determined to be less than the value of the threshold THn_d (step S132: NO), the error diffusion method threshold THe used for the error diffusion method is set to the high-level threshold THe_H (step S134). Accordingly, this embodiment has a configuration in which the error diffusion method threshold THe used for the error diffusion method (also called simply the "threshold THe" hereinafter) is changed on the basis of the result of the preliminary dithering processing, which is the result of the comparison. The setting of the threshold THe is carried out by referring to the error diffusion threshold table 62 stored in the EEPROM 60. Additionally, this embodiment assumes that the high-level threshold THe_H and the low-level threshold THe_L have been set in advance as described above in "A-3. Details Of High-frequency Component Determination Processing", before this processing is carried out.

In this embodiment, the error diffusion method threshold table 62 stored in the EEPROM 60 is referred to when setting the error diffusion method threshold THe to the low-level threshold THe_L or the high level threshold THe_H. However, the low-level threshold THe_L or the high-level threshold THe_H may be set with each instance of printing. In either case, the dither result application level control unit that controls the dither result application level creates the low-level threshold THe_L or the high-level threshold THe_H that is the error diffusion method threshold THe. There may be various methods for controlling the dither result application level, and of these, one example of the pre-set error diffusion threshold table 62 is given below. However, the method is not limited thereto, and the dither result application level may be controlled and changed as appropriate depending on the printing conditions.

Figure 10:
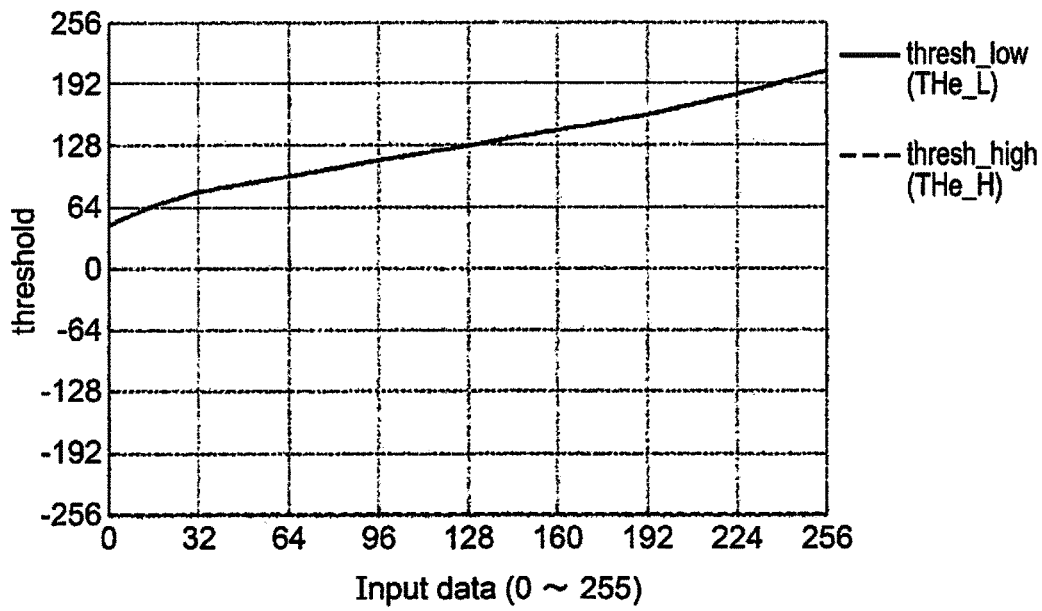
FIG. 10 illustrates gradation relationships between a first high-level threshold, a first low-level threshold, and pixel of interest data Dn.

FIG. 10 illustrates an example of the error diffusion threshold table 62. FIG. 10 illustrates an example of a first high-level threshold and a first low-level threshold at which the application level of the dithering method is greater than that of the error diffusion method. As illustrated in FIG. 10, in the error diffusion threshold table 62, the pixel of interest data Dn (input data 0 to 255) is associated with the low-level threshold THe_L (the broken line) and the high-level threshold THe_H (the solid line) respectively. In the example illustrated in FIG. 10, the high-level threshold THe_H has a value of approximately 45 when the gradation value of the pixel of interest data Dn is 0, gradually increases as the gradation value increases from 0, and ultimately becomes a value of approximately 205 when the gradation value is 255. However, cases where the gradation value is 0 or 255 may be treated as special cases, and different processing may be carried out. For example, the later determination of step S136 may be skipped, with the halftone result always being that the dot is "OFF" when the gradation value is 0, and the halftone result always being that the dot is "ON" when the gradation value is 255. The low-level threshold THe_L is fixed to −256, which is a lower value than the value of 0 serving as the lower limit of the gradation range of the pixel of interest data (0 to 255), regardless of the magnitude of the gradation value of the pixel of interest data Dn. Referring to the error diffusion threshold table 62, the CPU 40 acquires the high-level threshold THe_H or the low-level threshold THe_L and uses that threshold in the setting of step S133 or S134. Although this embodiment uses a configuration in which the high-level threshold THe_H and the low-level threshold THe_L are set according to the gradation value by referring to the error diffusion threshold table 62, the thresholds may be found using a function instead.

Once the threshold THe has been set in step S133 or S134 in the above-described FIG. 5 by referring to the error diffusion threshold table 62, the CPU 40 adds diffusion error Edn, which is stored in a separately-prepared error buffer, to the gradation value of the pixel of interest data Dn (step S135). The diffusion error Edn is computed in step S139, which will be described later, and the details thereof will be described later.

Once the diffusion error Edn is added to the gradation value of the pixel of interest data Dn, the CPU 40 compares a gradation value DnX of the pixel of interest data Dn to which the diffusion error Edn has been added (also called "correction data" hereinafter) with the threshold THe set in step S133 or step S134 (step S136). As a result, in a case where the correction data DnX=(Dn+Edn) is greater than or equal to the threshold THe (step S136: YES), the dot of the pixel of interest is determined to be "ON" (a dot is formed) (step S137), whereas in a case where the gradation value of the pixel of interest data Dn to which the diffusion error Edn has been added is less than the threshold THe (step S136: NO), the dot of the pixel of interest is determined to be "OFF" (a dot is not formed) (step S138).

The error diffusion unit 44 calculates a distribution of the error, resulting from the generation of dot data, to the surrounding pixels. Here, whether dot data is generated is considered to be equivalent to determining whether a dot is "ON" or "OFF", and thus the CPU 40 computes ED binarization error En and the diffusion error Edn (step S139). The ED binarization error En is a difference between the correction data and a gradation value RSLT indicating the dot "ON"/"OFF" result (a value of 255 or 0, here). As an equation, this is expressed through Equation (1) below.

$$En=\{Dn(x,y)+Edn(x,y)\}-RSLT(255 \text{ or } 0) \quad (1)$$

Accordingly, a new negative error is produced in a case where a dot is produced.

Figure 8:
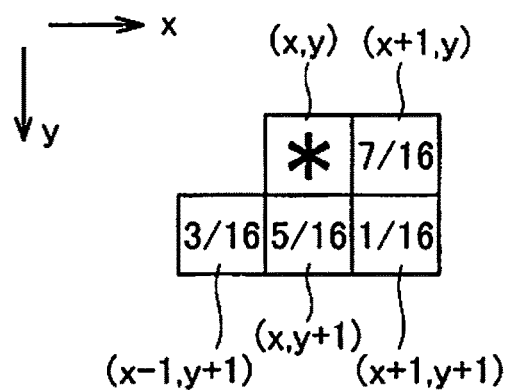
FIG. 8 is a diagram illustrating an example of an error diffusion range.

As a result, due to the error diffusion processing which will be described below, in a case where a dot is formed through a binarization processing, it becomes difficult for a dot to be formed in the surrounding pixels, whereas in a case where a dot is not formed, it becomes easy for a dot to be formed in the surrounding pixels. Error diffusion is a processing that finds the diffusion error Edn through Equation (2) below and distributes error produced in the pixel of interest to the surrounding pixels. The distributed error is accumulated and added to the gradation value of the pixel of interest data Dn in the aforementioned step S135. In this embodiment, as illustrated in FIG. 8, the ED binarization error En produced in the pixel of interest (*) is distributed by being added to the diffusion error Edn in each of the four pixels serving as the surrounding pixels for which a dot "ON"/"OFF" determination has not yet been made. In other words, the diffusion error Edn is distributed at a ratio of 7/16 to the pixel to the right of the pixel of interest, of 3/16 to the pixel to the lower-left, of 5/16 to the pixel below and of 1/16 to the pixel to the lower-right. The diffusion error Edn computed in this manner is stored in the error buffer, which is prepared in the RAM 52.

$$Edn(x+1,Y)=Edn(x+1,y)+En\times(7/16)$$

$$Edn(x-1,Y+1)=Edn(x-1,y+1)+En\times(3/16)$$

$$Edn(x,Y+1)=Edn(x,y+1)+En\times(5/16)$$

$$Edn(x+1,Y+1)=Edn(x+1,y+1)+En\times(1/16) \qquad (2)$$

The processing of steps S135 to S139 is a halftone processing using the error diffusion method, and is executed as the processing of the error diffusion unit 44. The error diffusion method is a known technique, and thus detailed descriptions thereof will not be given. However, the error diffusion method is a technique in which the quantization error of a processed pixel is added to the surrounding unprocessed image data at a predetermined distribution ratio, and while doing so, the image data is quantized by comparing the image data to which the distribution error has been added with a threshold. In the above-described example, steps S135 to S139 correspond to binarization processing for determining only whether a dot is "ON" or "OFF", but multivalued coded processing such as ternary processing for determining whether large dots and small dots are "ON" or "OFF" may be carried out instead.

After computing the ED binarization error En and the diffusion error Edn, the CPU 40 determines whether the above processing has been completed for all the pixels (step S140). Until the processing for all the pixels is completed, the CPU 40 repeats the processing of steps S131 to S139 while incrementing the position of the pixel of interest (x, y). The halftone processing of step S130 is completed in this manner.

The principles of this halftone processing will be described next. As described above, in the processing of steps S132 to S134, in a case where the gradation value of the pixel of interest data Dn is greater than or equal to the value of the threshold THn_d, the threshold THe used for the error diffusion method is set to the low-level threshold THe_L, whereas in a case where the gradation value of the pixel of interest data Dn is less than the value of the threshold THn_d, the threshold THe is set to the high-level threshold THe_H.

A-5. Error Diffusion Method Threshold Table:
A-5-1. High-Frequency Component Less than Set Amount:

FIG. 10 will be described here. FIG. 10 illustrates the error diffusion threshold table 62, which is an example of a table used in the printing mode or when the high-frequency component determination unit has determined that the high-frequency components of the image data are less than a set amount. FIG. 10 is characteristic in that the high-level threshold THe_H and the low-level threshold THe_L have a higher application level for the dithering method than for the error diffusion method. The low-level threshold THe_L is set to a negative value of −255 regardless of the gradation value of the pixel of interest data Dn. Accordingly, in a case where the pixel of interest data Dn is less than the dithering method threshold THn_d in step S132, the determination in step S136 is that Dn+Edn THe_L holds true with a probability close to 100%, thus a determination of the dot being "ON" (that a dot is formed) is made. Moreover, in this embodiment, the high-level threshold THe_H is set to a value close to an ideal threshold value as disclosed in Japanese Patent No. 3360391. As such, even if it is determined that no dot is to be formed as a result of the preliminary dithering processing, in a case where the accumulation of error from the surrounding pixels is sufficiently high, a determination of "YES" can be made in step S136 and a dot can be formed.

Figure 9A:
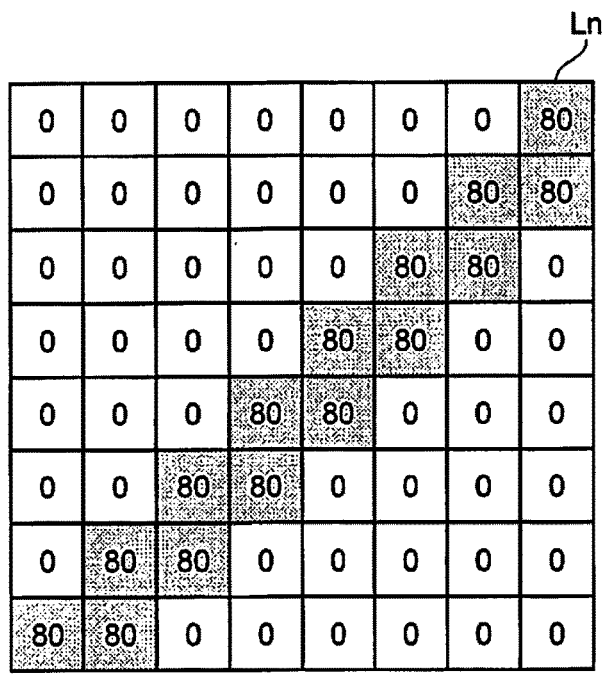
FIG. 9A is a diagram illustrating an example of a gradation value display for a fine line when the first exemplary embodiment is applied.
Figure 9B:
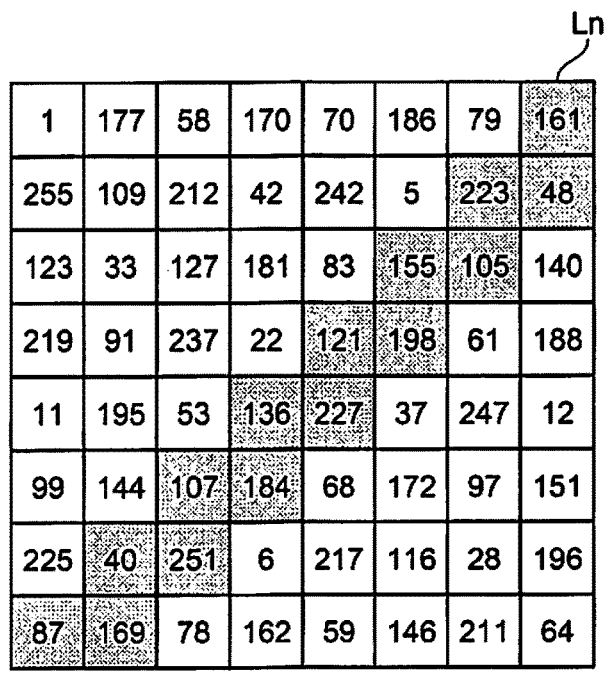
FIG. 9B is a diagram illustrating an example in which the dither mask 61 is applied for a fine line, when the first exemplary embodiment is applied.
Figure 9C:
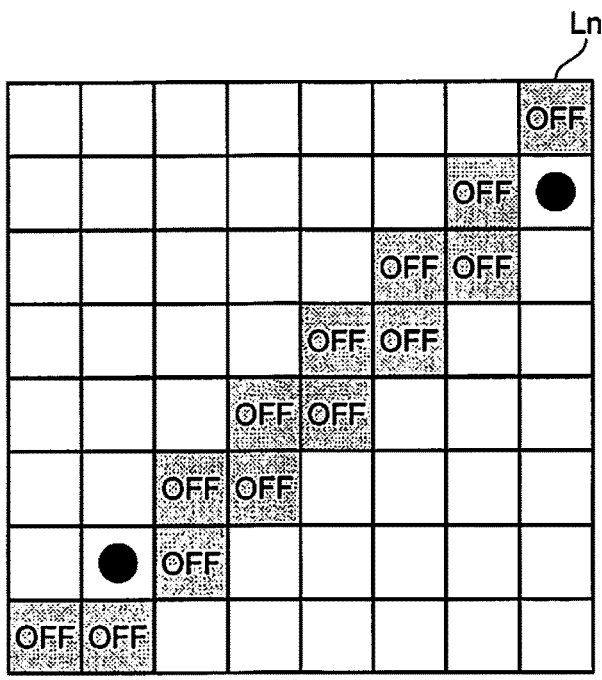
FIG. 9C is a diagram illustrating an example of a halftone result from a preliminary dithering method for a fine line, when the first exemplary embodiment is applied.
Figure 9D:
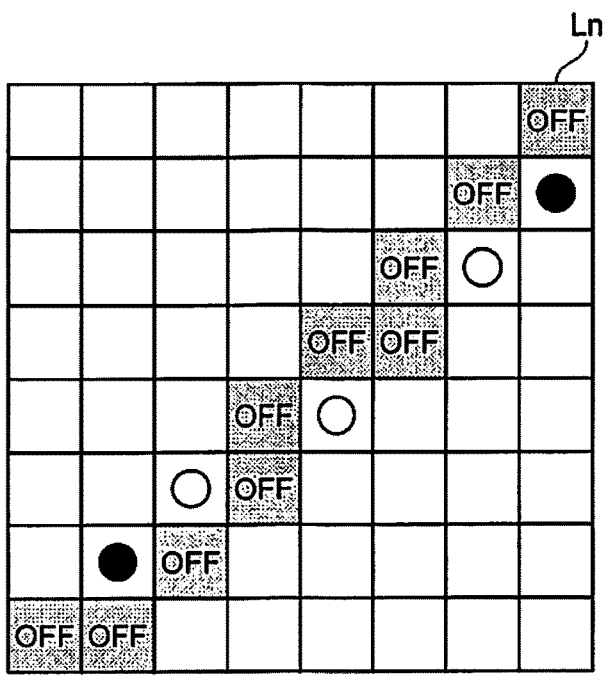
FIG. 9D is a diagram illustrating an example of a halftone result from an error diffusion method for a fine line, when the first exemplary embodiment is applied.

This will be described in more detail. FIGS. 9A to 9D are diagrams illustrating the formation of fine lines. FIG. 9A illustrates a case where a line segment Ln inclined 45 degrees from the vertical is drawn as original image data. In FIG. 9A, the filled regions correspond to each pixel of the line segment Ln, and it is assumed that the line segment has a relatively low density with a gradation value of 80. On the other hand, assuming that each corresponding threshold THn_d in the dither mask 61 has the value illustrated in FIG. 9B, the result of the preliminary dithering processing using the dither mask 61 is as illustrated in FIG. 9C. The dither mask 61 is excerpted from FIG. 6. When the result of the preliminary dithering processing is reflected as whether a dot is "ON" or "OFF", a pixel in which the dot is determined to be "ON" in correspondence with the line segment Ln is a pixel indicated by the black circle (•) in FIG. 9C. A dot is determined to be "ON" only for pixels in which the threshold of the dither mask 61 is 40 and 48. The line segment illustrated in diagram is constituted by 15 pixels, so that 15*80/255≈4.7, and thus approximately 4 to 5 pixels among the pixels in the line segment are expected to have the dots being "ON". However, in the dithering method, pixel positions where the dots are "ON" are already set for cases where the gradation value is 80, and thus depending on the position of the line segment, only a very small number of dots will produced on the line segment, and the line will therefore break. This is a problem with the dithering method. As opposed to this, in this embodiment, the error diffusion processing using the error diffusion method threshold THe is carried out in addition to the result of the preliminary dithering processing, and thus even if the result of the preliminary dithering processing indicates that the dot is "OFF" (the dot is not formed), a dot will be formed in pixels determined through the error diffusion method to be pixels where a dot is to be produced, as a result of comparison with the high-level threshold THe_H based on the value of the pixel of interest data Dn. In the result illustrated in FIG. 9D, pixels determined to have the dot being "ON" are pixels indicated by the white circles (o), for example. In this example, dots are determined to be formed through the error diffusion processing even for pixels where the dithering method threshold THn_d has a value of 107, 227, and 105.

In other words, problems where a fine line is not displayed or breaks due to the dithering method do not easily arise. At this time, the halftone processing illustrated in FIG. 5 makes absolutely no determination between whether the target being processed is an image of a line or a natural image such as a photographic image. Accordingly, even if, for example, a region corresponding to an image of the line transitions to a region of a natural image, an image of a line is present in a natural image, or the like, simply carrying out the same halftone processing (FIG. 5) will, in the region corresponding to the image of the line, result in dots that were lost through the dithering method processing being supplemented through the error diffusion method and the line image being displayed appropriately, and will, in the region corresponding to the natural image, result in dots being produced through the dithering method as a result of the characteristics of the dither mask 61 (e.g., blue noise characteristics). In a case where it is reasonable that a dot is produced through the dithering method, it is unlikely that an additional dot will be produced through the error diffusion method, which makes it possible to maintain sufficient image quality, including graininess in bidirectional printing, even in the case of a natural image.

Additionally, in this embodiment, a value that increases in accordance with the gradation value of the pixel of interest data Dn is used as the threshold employed in the error diffusion method (the high-level threshold THe_H), as indicated in FIG. 10. Accordingly, it is unlikely that low-density fine lines will be lost or that a phenomenon such as tailing will arise, as disclosed in Japanese Patent No. 3360391. Furthermore, a further improvement in image quality can be expected in a case where a processing that switches the error diffusion range illustrated in FIG. 8 in accordance with the gradation value of the pixel of interest data Dn is carried out. The method of carrying out error diffusion while switching the diffusion range is a known technique, and will therefore not be described in detail here. However, in a case where the error diffusion range is switched in accordance with a combination of the input gradation value and the result of a binarization processing, the graininess in low-gradation regions can be improved, and the continuation of undesired dots, called "worm occurrence", can be suppressed, by carrying out the error diffusion over a broad range only when dots are on for low-gradation values.

The ability to incorporate, into the dither mask, characteristics that enable the suppression of a drop in image quality caused by skew in the dot landing positions can be given as an example of an advantage of applying a dithering method-type element in high-gradation areas. This advantage stems from the above-described predetermined dot formation characteristics of the dither mask 61. Note that in high gradation regions, it is unlikely that graininess will be apparent in the print quality due to ink bleeding even when dot data is formed through the dithering method, and thus graininess will not be a problem.

Figure 11:
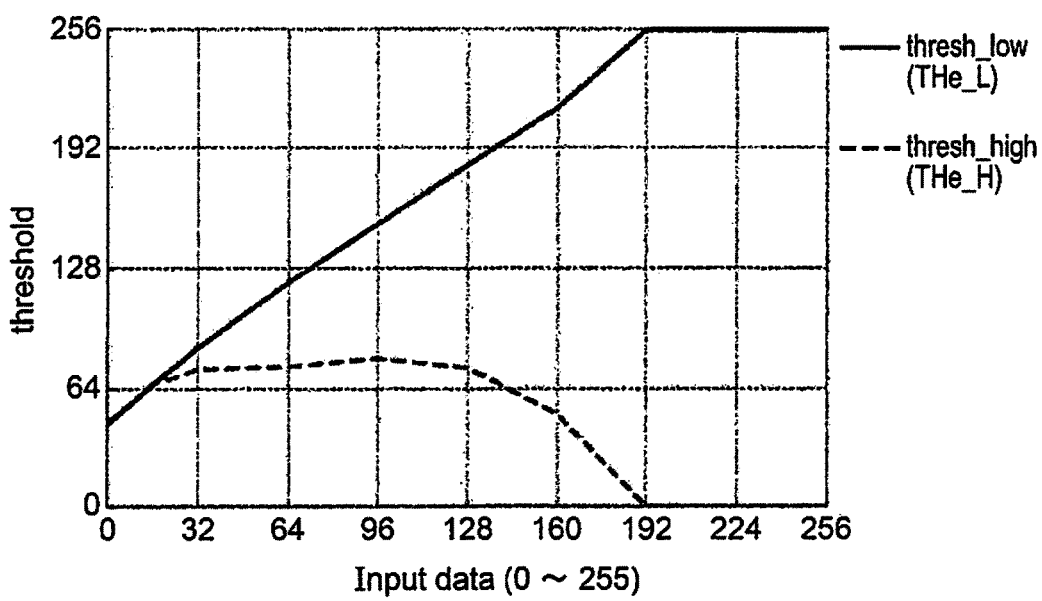
FIG. 11 illustrates gradation relationships between a second high-level threshold, a second low-level threshold, and the pixel of interest data Dn.

A-5-2. High-Frequency Component Greater than or Equal to Set Amount:

FIG. 11 will be described next. FIG. 11 illustrates the error diffusion threshold table 62, which is an example of a table used in a reflective copying mode or when the high-frequency component determination unit has determined that the high-frequency components of the image data are greater than or equal to a set amount. FIG. 11 illustrates an example in which the high-level threshold THe_H and the low-level threshold THe_L have a higher level of application of the error diffusion method than the above-described high-level threshold THe_H and the low-level threshold THe_L having a higher level of application of the dithering method than the error diffusion method (FIG. 10). Regions in FIG. 11 where the high-level threshold and the low-level threshold match and the pixel of interest data Dn (input data) is less than or equal to 16 have thresholds obtained in the case where the threshold-optimized error diffusion method is employed as the error diffusion method used in step S130. Threshold-optimized error diffusion method is a known technique, and will therefore not be described in detail here. However, the technique changes the threshold in accordance with the input gradation value, and can therefore suppress so-called dot formation delay, tailing, and the like.

In the example illustrated in FIG. 11, the high-level threshold THe_H has a value of approximately 45 when the gradation value of the pixel of interest data Dn is 0, and gradually increases as the gradation value increases from 0, ultimately becoming a value of approximately 255 when the gradation value is 192. The values of the high-level threshold THe_H and the low-level threshold THe_L match in a range where the gradation value of the pixel of interest data Dn is from 0 to 16. In other words, in a range where the gradation value of the pixel of interest data Dn is from 0 to 16, a threshold difference ΔTHe between the high-level threshold THe_H and the low-level threshold THe_L is a value of 0. In a range where the gradation value is from 16 to 192, the low-level threshold THe_L is set lower than the high-level threshold THe_H, and the high-level threshold THe_H and the low-level threshold THe_L are set so that the threshold difference ΔTHe increases with the gradation value. In a range where the gradation value is from 192 to 255, the high-level threshold THe_H and the low-level threshold THe_L are set so that the threshold difference ΔTHe is constant at a value of 255.

When the error diffusion threshold table 62 has these characteristics, by setting the threshold difference ΔTHe to a value of 0 in low-gradation regions (here, where the gradation value is from 0 to 16), using a threshold-optimized error diffusion method to carry out the halftone processing only through error diffusion method-type elements makes it possible to sufficiently realize the advantages of the threshold-optimized error diffusion method, which is better than the dithering method with respect to graininess in low-gradation regions.

In high-gradation regions (here, gradation values from 192 to 255), setting the threshold difference ΔTHe to a value that essentially corresponds only to dithering method-type elements makes it possible to sufficiently realize the advantages of the dithering method-type elements, namely suppressing a drop in image quality caused by skew in the dot landing positions. From the standpoint of graininess, error diffusion method-type elements are better than dithering method-type elements. However, even if the dithering method-type elements are strengthened in high-gradation regions, ink bleeding and the like ensure that graininess is not a major problem with respect to the print quality.

In mid-gradation regions (here, gradation values from 16 to 192), combining the error diffusion method-type elements and the dithering method-type elements and carrying out the halftone processing such that the dithering method-type elements become stronger as the gradation value increases makes it possible to smoothly change the level of application of the dithering method-type elements and the error diffusion method-type elements. In this manner, the characteristics of the error diffusion threshold table 62 according to this embodiment enabled the optimal halftone processing to be carried out in accordance with the gradation value.

Here, a case where the threshold difference ΔTHe is a value of 0 (THe_H=THe_L) will be considered. In this case, the result of the preliminary dithering processing has no effect on the threshold THe, and thus the processing from step S132 to S134 has no meaning with respect to the ultimate determination of whether a dot is "ON" or "OFF" through the error diffusion method (step S135 to S139). This means that in the halftone processing of step S130, whether a dot is "ON" or "OFF" is ultimately determined only by the error diffusion method-type elements.

Next, a case where the threshold difference ΔTHe is greater than a value of 0 (THe_H>THe_L) will be considered. In this case, when a dot is determined to be "ON"

through the preliminary dithering processing (this refers to the gradation value of the pixel of interest data Dn being greater than or equal to the value of the threshold THn_d), the CPU 40 sets the threshold THe to the relatively low low-level threshold THe_L. On the other hand, when a dot is determined to be "OFF" through the preliminary dithering processing (this refers to a case where the gradation value of the pixel of interest data Dn is less than the value of the threshold THn_d), the threshold THe is set to the relatively high high-level threshold THe_H. In other words, the CPU 40 carries out control such that it is easier for a dot to be "ON" through the error diffusion method when the dot is determined to be "ON" through the preliminary dithering processing, and carries out control such that it is easier for a dot to be "OFF" through the error diffusion method when the dot is determined to be "OFF" through the preliminary dithering processing. This means that the result of determining whether a dot is ultimately "ON" or "OFF" through the error diffusion method is closer to the result of determining whether a dot is "ON" or "OFF" through the preliminary dithering processing than in the case where the threshold difference ΔTHe is a value of 0. In other words, whether a dot is ultimately "ON" or "OFF" is determined using dithering method-type elements in addition to error diffusion method-type elements.

As the threshold difference ΔTHe increases, so do the dithering method-type elements, and when the threshold difference ΔTHe reaches infinity, the determination as to whether a dot is "ON" or "OFF" is carried out using only dithering method-type elements. This is because when the threshold difference ΔTHe is infinite, a dot determined to be "ON" through the preliminary dithering processing will always be determined to be on through the subsequent error diffusion method, and a dot determined to be "OFF" through the preliminary dithering processing will always be determined to be "OFF" through the subsequent error diffusion method.

In other words, changing the threshold THe in accordance with the result of the preliminary dithering processing, and specifically changing the magnitude of the threshold difference ΔTHe, makes it possible to control the levels of application of the dithering method-type elements and the error diffusion method-type elements in the halftone processing. This embodiment makes use of this principle to dynamically control the dithering method-type elements and the error diffusion method-type elements in the halftone processing in accordance with the gradation value of the pixel of interest data Dn. This can also be interpreted as controlling how easy it is to control a dot to be formed through the error diffusion method in accordance with the magnitude of the threshold difference ΔTHe.

In this embodiment, the result of the dithering method is determined again through the error diffusion method, and the threshold difference ΔTHe indicates the permissible range thereof. In other words, the permissible range becomes broader as the threshold difference ΔTHe increases. In a case where the determination result from the dithering method is within the permissible range from the perspective of the error diffusion method, that result is accepted, whereas in a case where the determination result exceeds the permissible range, the dithering method result is overridden. At this time, a principal of the error diffusion method, in which the average error in nearby regions is minimize, is in effect. Accordingly, in effect of suppressing a drop in image quality due to high-frequency components can be realized.

Comparing FIGS. 10 and 11, ΔTHe is greater in FIG. 11 than in FIG. 10 in regions where the gradation value of the pixel of interest data Dn (input data) is greater than or equal to 192. Thus, although the contribution of dithering appears to be greater in FIG. 11, dithering is primarily set for that area in either case, and thus it can also be said that there is not a major difference. In this embodiment, what is important is that the contribution of error diffusion is greater in FIG. 11, in ranges from low-gradation regions to mid-gradation regions where there is at least little bleeding between dots and the dot arrangement can be clearly recognized. It is acceptable for this to be reversed from mid-gradation regions to high-level radiation regions.

B. Second Exemplary Embodiment

A second exemplary embodiment of the invention will be described. The configuration of the printer 20 is the same as in the first exemplary embodiment, and only the flow of the printing processing, and specifically a printing mode determination unit, differs from the first exemplary embodiment. The following will omit points that are the same as in the first exemplary embodiment, and only the differences will be described.

Figure 12:
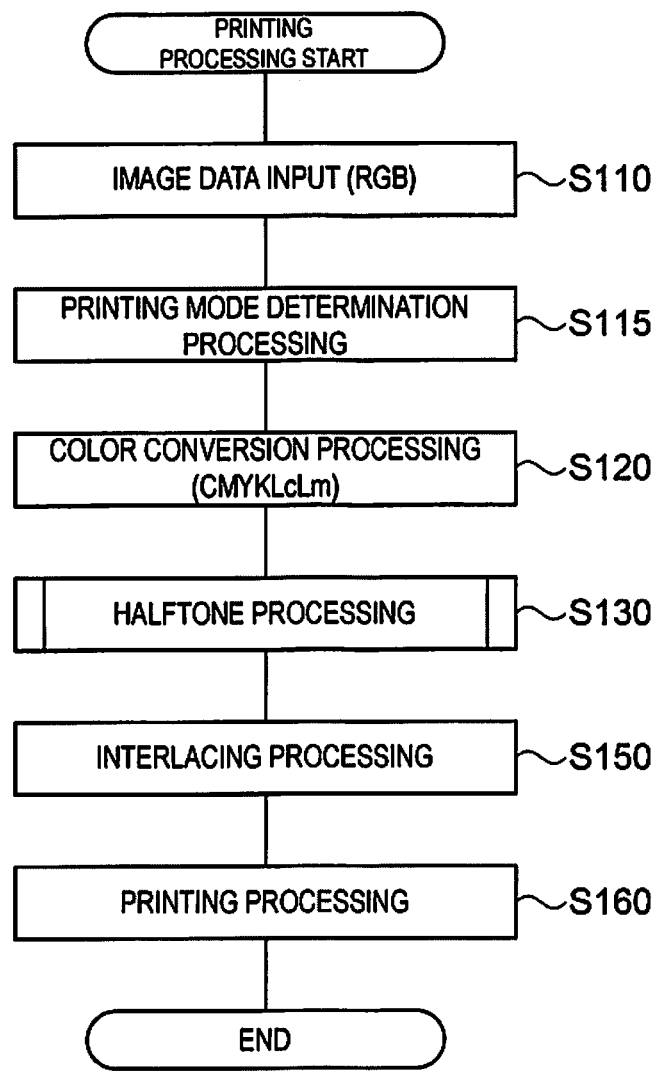
FIG. 12 is a flowchart illustrating the flow of a printing processing according to a second exemplary embodiment.
Figure 13:
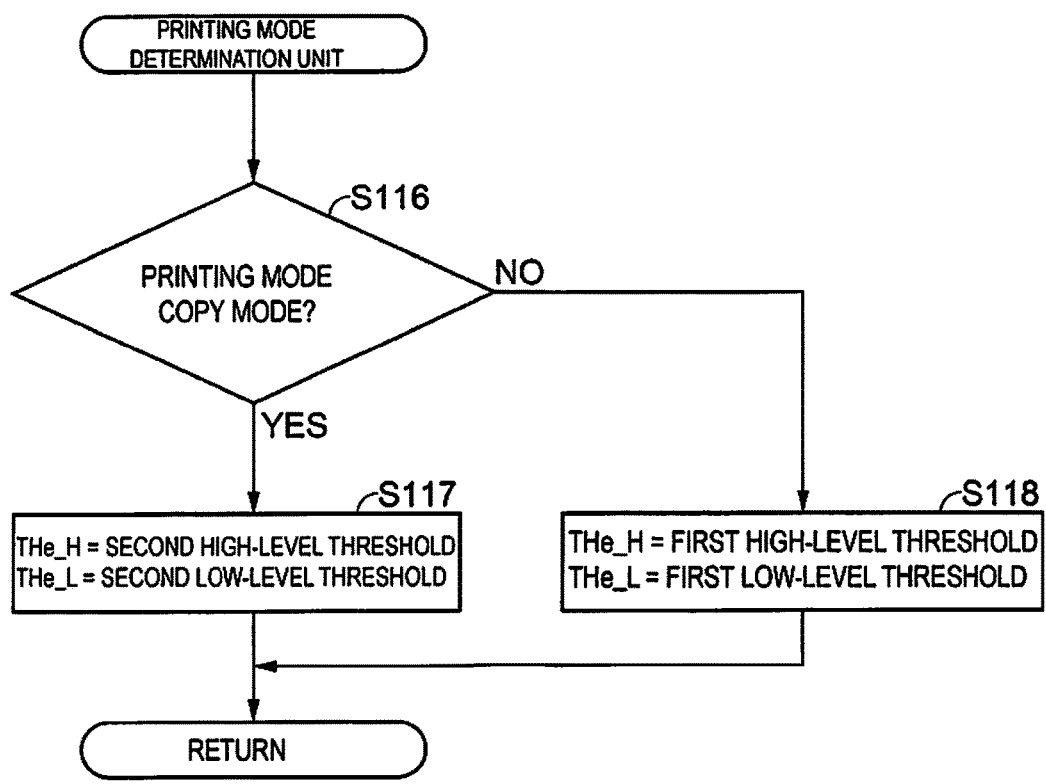
FIG. 13 is a flowchart for a printing mode determination unit according to the second exemplary embodiment.

FIG. 12 is a flowchart illustrating the flow of the printing processing carried out by the printer 20. Once the image data ORG is input, the CPU 40 carries out a printing mode determination processing (step S115). The printing mode determination processing will be described in detail using FIG. 13. As illustrated in FIG. 13, when the RGB-format image data ORG is read and input as the item to be printed in step S110, the CPU 40 determines a printing mode of the image data (step S116). In a case where the printing mode is the reflective copying mode (step S116: YES), the CPU 40 substitutes the second high-level threshold for the high-level threshold THe_H and the second low-level threshold for the low-level threshold THe_L, respectively (step S117). In a case where the printing mode of the image data is not the reflective copying mode (step S116: NO), the first high-level threshold is substituted for the high-level threshold THe_H and the first low-level threshold is substituted for the low-level threshold THe_L, respectively (step S118). The setting to the high-level threshold THe_H and the low-level threshold THe_L is carried out by referring to the error diffusion threshold table 62 stored in the EEPROM 60.

The halftone processing according to the second exemplary embodiment is the same as the processing illustrated in FIG. 5 and described as the halftone processing above in the first exemplary embodiment, and will therefore not be described here.

In the reflective copying mode according to this embodiment, setting the error diffusion threshold table 62 to thresholds such as those illustrated in FIG. 11 makes it possible to realize halftones compatible with the error diffusion method when the input gradation value is less than 16, with the level of application of the dithering method increasing gradually from 16 and greater, and substantially compatible with the dithering method at 192 and above. Note that a blue noise-type dither mask, which has robust characteristics with respect to landing position skew, is used as the dither mask used in the dithering method. In FIG. 11, a slight worsening in graininess arises in intermediate input gradation regions where the dithering method switches over to the error diffusion method, but this is only a problem when high-quality data having extremely little noise is input, and is not a major problem with copy data of a reflected document where a certain degree of noise is unavoidable.

With the exception of special modes where a user can make selections through instructions for special types of documents, in cases where source data is taken from a computer or a smartphone and output, in a case where the printing mode in this embodiment is not the reflective copying mode, setting the error diffusion threshold table 62 to thresholds such as those indicated in FIG. 10 means that the high-level threshold THe_H is a threshold optimized for normal error diffusion, i.e., the ideal threshold described in Japanese Patent No. 3360391. With such settings, the error diffusion method is almost completely absent in spatial regions where the dithering method provides sufficiently high-quality output. However, in cases where the dithering method does not sufficiently produce the required dots, such as low-density fine lines on a white background, the error diffusion method acts to supplement the missing dots, which makes it possible to realize halftones that are both compatible with the dithering method and have superior reproducibility of low-density fine lines. The high-level threshold THe_H may be set to a slightly lower threshold than that indicated in FIG. 10 in low-gradation regions of the image data in order to enhance low-density fine lines.

C. Third Exemplary Embodiment

A third exemplary embodiment of the invention will be described. The configuration of the printer 20 is the same as in the first exemplary embodiment. However, the flow of the printing processing differs from that of the first exemplary embodiment, specifically when the high-frequency component determination unit has determined that the high-frequency components of the image data are less than a set amount, or when in the second exemplary embodiment, the printing mode determination unit has determined that the printing mode is not the reflective copying mode. The following will omit points that are the same as in the first exemplary embodiment, and only the differences will be described.

Figure 14:
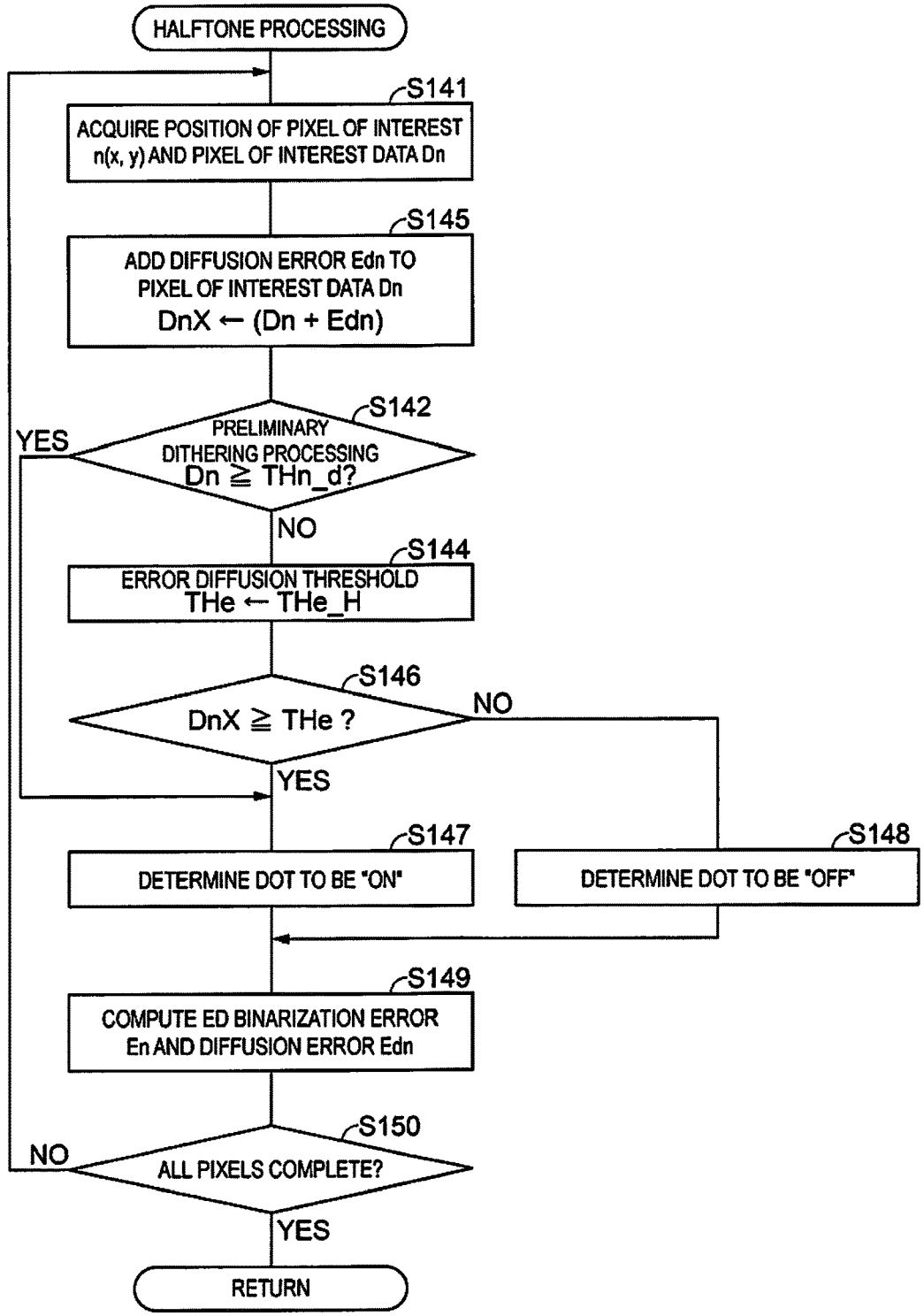
FIG. 14 is a flowchart illustrating the flow of a halftone processing according to a third exemplary embodiment.

FIG. 14 illustrates a flowchart of the halftone processing according to Modified Example 1. Points that are the same as in FIG. 5 will be omitted, and only the differences will be described. The CPU 40 carries out the preliminary dithering processing as the processing of the comparison unit 43 (step S142). In a case where the result of the preliminary dithering processing indicates that the gradation value of the pixel of interest data Dn is greater than or equal to the value of the threshold THn_d (step S142: YES), the dot of the pixel of interest is determined to be "ON" (a dot is determined to be formed), without setting the threshold THe used for the error diffusion method to the low-level threshold THe_L (step S147). However, in a case where the gradation value of the pixel of interest data Dn is determined to be less than the value of the threshold THn_d (step S142: NO), the error diffusion method threshold THe used for the error diffusion method is set to the high-level threshold THe_H (step S144). Additionally, the diffusion error Edn stored in the error buffer prepared separately is added to the gradation value of the pixel of interest data Dn, regardless of whether the dot is "ON" or "OFF" in the preliminary dithering processing (step S145). In FIG. 14, the processing of adding the diffusion error Edn (step S145) is carried out before the preliminary dithering processing (step S142), but this is a processing unrelated to the preliminary dithering processing. In the preliminary dithering processing, basically, the pixel of interest data Dn is compared to the threshold THn_d. The diffusion error Edn is computed in step S149, which will be described later, and the details thereof are the same as described earlier.

Once the diffusion error Edn is added to the gradation value of the pixel of interest data Dn, the CPU 40 determines, as a result of the preliminary dithering processing, that the dot is "ON" (a dot is to be formed) for the pixel of interest, when the gradation value of the pixel of interest data Dn is greater than or equal to the value of the threshold THn_d (step S147). However, when the gradation value of the pixel of interest data Dn is less than the value of the threshold THn_d, the correction data obtained by adding the diffusion error Edn to the pixel of interest data Dn is compared to the threshold set in step S144 (step S146). As a result, in a case where the correction data DnX=(Dn+Edn) is greater than or equal to the threshold THe (step S146: YES), the dot is determined to be "ON" (a dot is determined to be formed) for the pixel of interest (step S147), whereas in a case where the gradation value of the correction data DnX=(Dn+Edn) is less than the threshold THe (step S146: NO), the dot is determined to be "OFF" (a dot is determined not to be formed) for the pixel of interest (step S148).

Once the dot is determined to be "ON" or "OFF", the CPU 40 computes the ED binarization error En and the diffusion error Edn (step S149). The ED binarization error En and the diffusion error Edn are as described earlier.

After computing the ED binarization error En and the diffusion error Edn, the CPU 40 determines whether the above processing has been completed for all the pixels (step S150). Until the processing for all the pixels is completed, the CPU 40 repeats the processing of steps S141 to S150 while incrementing the position of the pixel of interest (x, y). The halftone processing of step S130 is completed in this manner.

As described above, when the high-frequency components are determined to be less than a set amount in the first-exemplary embodiment or when the printing mode is determined to be a mode aside from the reflective copying mode in the second exemplary embodiment, in a case where the gradation value of the pixel of interest data Dn is greater than or equal to the value of the threshold THn_d in the processing of steps S142 to S148, the dot is set to "ON" without setting or referring to the error diffusion method threshold THe, whereas in a case where the gradation value of the pixel of interest data Dn is less than the value of the threshold THn_d (a dot being "OFF" in the preliminary dithering processing), the error diffusion method threshold THe is set to the high-level threshold THe_H and error diffusion method is applied. This achieves an effect of shortening the time for the halftone processing as a whole and improving the throughput.

D. Fourth Exemplary Embodiment

Figure 15:
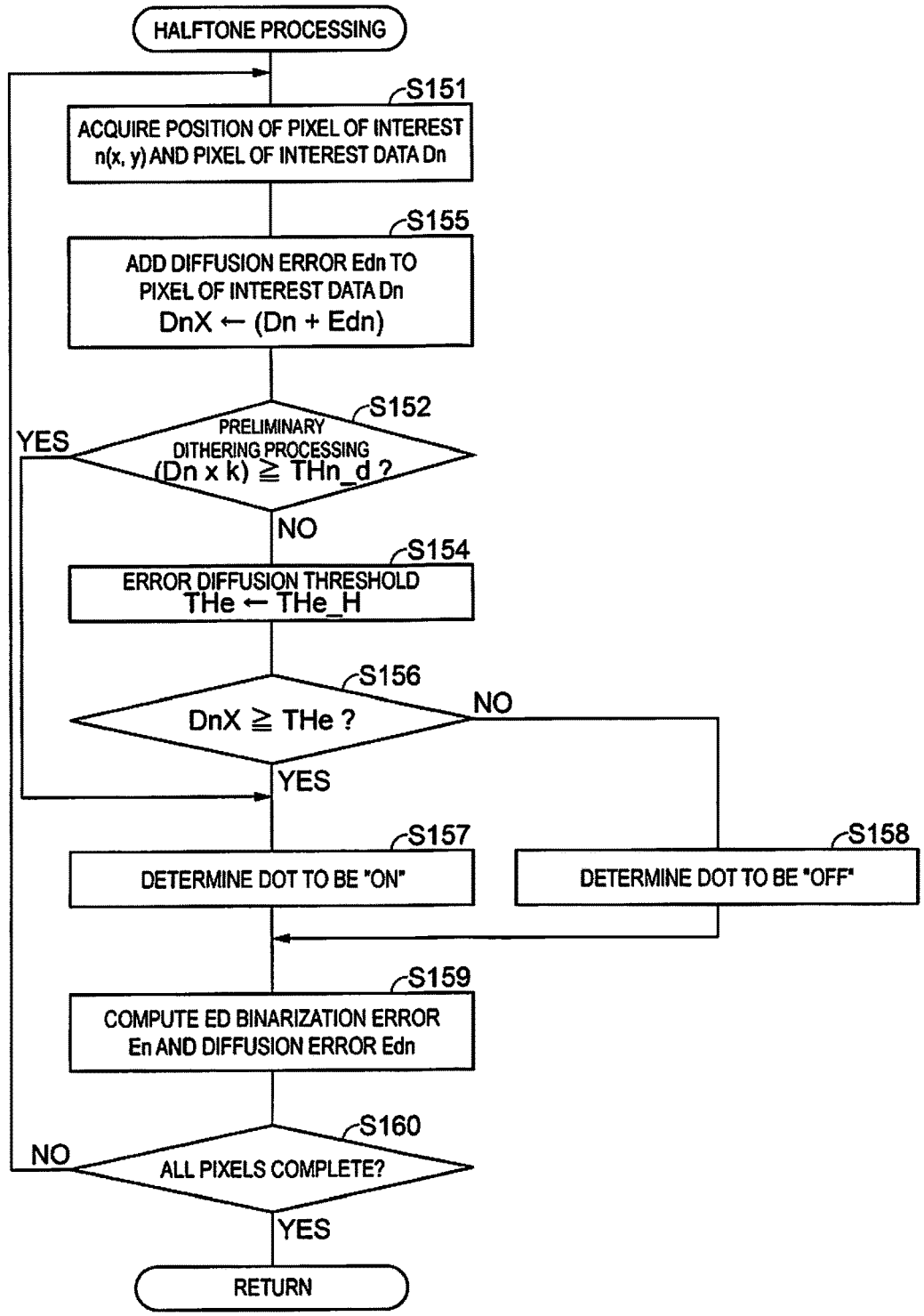
FIG. 15 is a flowchart illustrating the flow of a halftone processing according to a fourth exemplary embodiment.

A fourth exemplary embodiment of the invention will be described next. The configuration of the printer 20 is the same as in the first exemplary embodiment, and the same printing processing (FIG. 2) is executed. The printer 20 according to the fourth exemplary embodiment differs from the first exemplary embodiment in terms of the halftone processing thereof. The halftone processing executed by the printer 20 according to the fourth exemplary embodiment is illustrated in FIG. 15. Compared to the first exemplary embodiment, the halftone processing executed by the printer 20 according to the fourth exemplary embodiment differs only in terms of step S152, which will be described next. The other steps S154 to S160 are the same as steps S134 to S140 in the first exemplary embodiment.

FIG. 15 illustrates a flowchart of the halftone processing according to the fourth exemplary embodiment. Points that are the same as in FIG. 5 will be omitted, and only the differences will be described. In the fourth exemplary embodiment, when the halftone processing starts, first, the CPU 40 acquires the coordinate data n(x, y) of the position of the pixel of interest and the pixel of interest data Dn, and carries out a processing for finding a value obtained by multiplying the gradation value of the pixel of interest data Dn by a predetermined coefficient k (0<k≤1). The data computed in this manner is a gradation value related to the gradation value of the pixel of interest data Dn, and is therefore also called "related data" (Dn×k). The coefficient k is 0.9 in this embodiment.

Once the related data is computed, the CPU 40 carries out the preliminary dithering processing as the processing of the comparison unit 43 (step S152). The difference from the preliminary dithering processing of step S132 indicated in FIG. 5 is that the related data (Dn×k) and the threshold THn_d are compared instead of comparing the gradation value of the pixel of interest data Dn with the threshold THn_d of the dither mask 61.

In a case where the result indicates that the related data (Dn×k) is greater than or equal to the value of the threshold THn_d (step S152: YES), the dot of the pixel of interest is determined to be "ON" (a dot is determined to be formed), without setting the threshold THe used for the error diffusion method to the low-level threshold THe_L (step S157). On the other hand, in a case where the related data (Dn×k) is less than the threshold THn_d (step S152: NO), the threshold THe used for the error diffusion method is set to the high-level threshold THe_H (step S154). The subsequent the error diffusion method processing (step S156 to S159) is the same as in the first exemplary embodiment, and thus will not be described. Note that the determination as to whether the dot is "ON" or "OFF" in the error diffusion method is carried out using the correction data DnX=(Dn+Edn) of the pixel of interest data Dn, rather than the related data (Dn×k).

In this embodiment, the coefficient k is set to 0.9, and thus the percentage of determinations that a dot is to be produced in the preliminary dithering processing is kept to 90% of the normal determinations, such as those in the first exemplary embodiment. As a result, the remaining 10% are produced by the determination in the error diffusion method (step S156). By doing so, the rate of contribution of dots produced from determinations made through the dithering method and dots produced from determinations made through the error diffusion method as supplements thereto can be set as desired.

The coefficient k can be set as desired from 0 to 1.0, and thus the total number of dots produced by determinations through the dithering method and dots produced by determinations through the error diffusion method can be set as appropriate. For example, in a case where the coefficient k is 1, the effect is the same as in the first exemplary embodiment, but in this case, dots are produced through the error diffusion method as adding to the dots produced by determinations through the dithering method. Thus, in this case, there are situations where a slightly larger number of dots are formed, compared to the density in the original image. As opposed to this, in a case where the coefficient k is set to a value slightly lower than 1.0, such as the 0.9 in this embodiment, the number of dots produced by the determinations in the preliminary dithering processing decreases slowly, and thus it is possible to produce only the amount required to make up for the insufficient amount by determinations through the error diffusion method. The gradations expressed by the total number of dots produced can be made to better match the gradations of the original image.

Furthermore, in a case where the coefficient k is set to a function of the pixel of interest data Dn, the ratio of dots produced by the dithering method can be set to a desired ratio in accordance with the gradation value of the image. In a case where the default value of the coefficient k is set to 1 to suppress the production of dots through the dithering method at a given gradation value, it is sufficient to slightly reduce the coefficient k near that gradation of the pixel of interest data Dn. Note that when the coefficient k is changed in accordance with the gradation value, it is further preferable that the coefficient k may be gradually increased or decreased so that the ratio of dots produced changes smoothly. For example, in a case where properties similar to those in FIG. 11 are given, the coefficient k may be set so that k is set to 0 when the gradation value is less than or equal to 16, k is set to 1 when the gradation value is greater than or equal to 192, and the value of k changes gradually from 0 to 1.

E. Fifth Exemplary Embodiment

Figure 16:
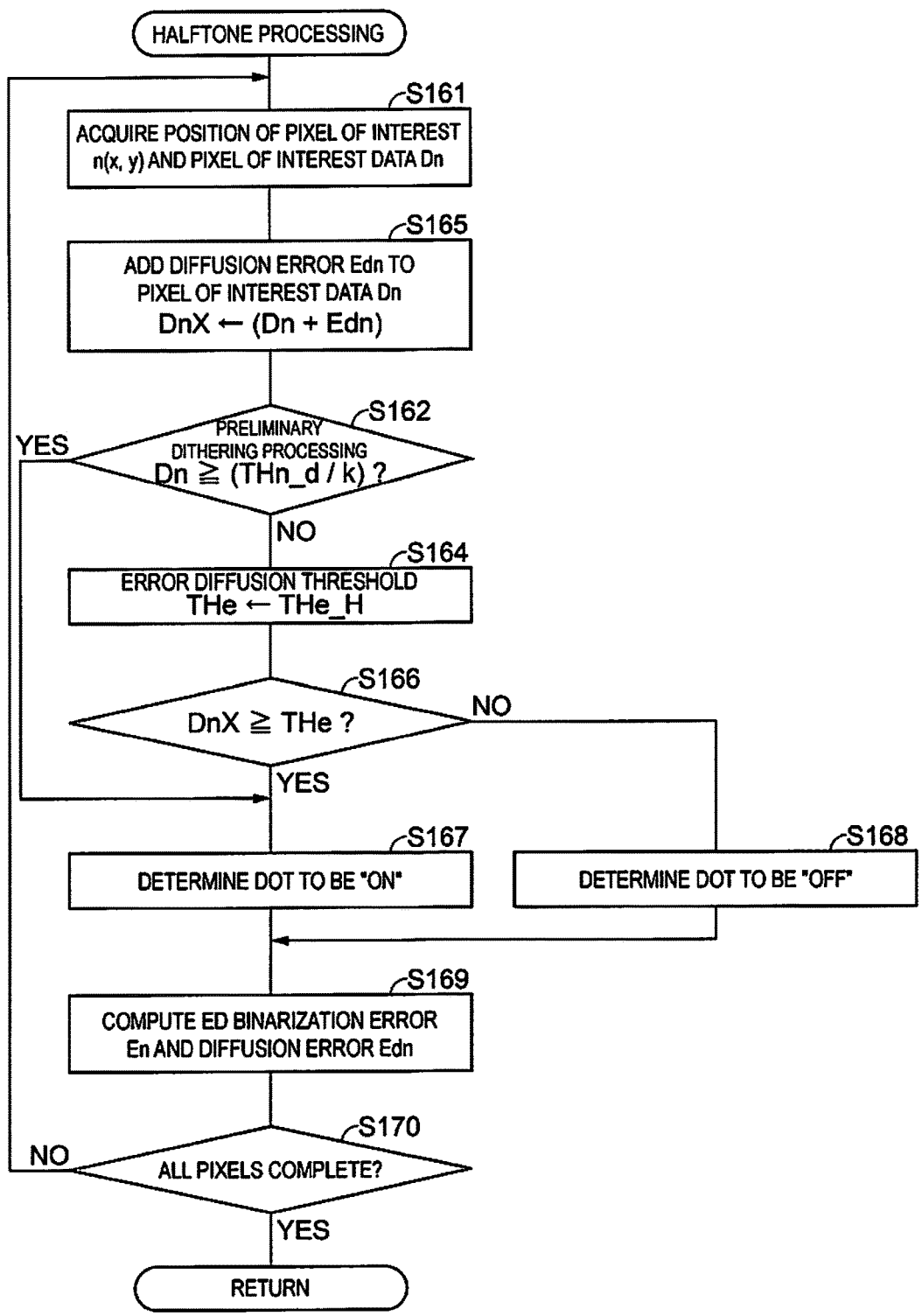
FIG. 16 is a flowchart illustrating the flow of a halftone processing according to a fifth exemplary embodiment.

A fifth exemplary embodiment of the invention will be described next. FIG. 16 illustrates a flowchart of the halftone processing according to the fifth exemplary embodiment. The fifth exemplary embodiment is different from the fourth exemplary embodiment only in that step S152 in FIG. 15 has been changed to step S162 in FIG. 16. Specifically, while in step S152 the input data side is reduced by multiplying the pixel data Dn by k, in step S162, the threshold side is increased by dividing the dithering threshold THn_d by k, which provides the same result. However, when the rate of contribution of the dithering is to be 0, k may be set to 0 in step S152, but setting k to 0 in step S162 results in a division error. When k is 0, setting the value of THn_d/k in step S162 to a sufficiently high and appropriate value (any value greater than the maximum value of Dn) makes it possible to cause both of these to match even when k is 0.

F. Modified Example 1

When it can be determined that the disappearance of low-density fine lines will not be a particular problem in the image data to be printed, and when the high-frequency component determination unit has determined in the first exemplary embodiment that the high-frequency components of the image data are less than a set amount, or when the printing mode determination unit in the second exemplary embodiment has determined that the printing mode is a mode aside from the reflective copying mode, it is acceptable for the halftone processing unit 42 to use only the dithering method. Specifically, this corresponds to a case where the source data is assumed to be high-quality photographic data. In this manner, the error diffusion method may be omitted when it can be determined in advance, for the image data to be printed, that omitting the error diffusion method will still result in a print quality that is not a problem.

Intentionally selecting a halftone processing, in accordance with the image data to be printed, in which the required print quality can be obtained by an ink jet printer leads to a halftone processing that is not wasteful, which achieves an effect of improving the overall throughput of the halftone processing.

G. Modified Example 2

The issue addressed by this invention, namely that when using a document containing many high-frequency components and printed by an ink jet printer as an input document for copying, a phenomenon in which noise is produced in mid-and low-frequency components of the output printed image and the graininess worsens significantly, does not arise when the image data to be printed is a high quality transparent document or the like. Accordingly, a halftone processing where the level of application of the dithering method is high, which is the halftone processing used in the case of the printing mode, may be carried out.

H. Modified Example 3

When the high-frequency components of the image data in the first exemplary embodiment are determined to be greater than or equal to a set amount, or when it is determined that the mode is the reflective copying mode in the second exemplary embodiment, the threshold difference ΔTHe is changed in accordance with the gradation values on the basis of the example illustrated in FIG. 11 in the halftone processing according to the above-described embodiments. However, the threshold difference ΔTHe may be set to a constant value that is not dependent on the gradation value. With this configuration, a halftone processing that incorporates both error diffusion method-type elements and dithering method-type elements can also be carried out.

I. Modified Example 4

The above embodiments described a configuration in which the printer 20 changes the threshold THe used to determine whether the dots are "ON" or "OFF" in the error diffusion method to control the ease with which dots are formed in the error diffusion method, and to change the level of application of the error diffusion method-type elements and the dithering method-type elements in the halftone processing. However, the control of the ease with which dots are formed in the error diffusion method is not limited to this format. For example, in a case where the result of the preliminary dithering processing is that a dot is "ON", a predetermined value β (where β>0) may be added to the gradation value of the pixel of interest data Dn with which the error diffusion method is employed, whereas in a case where the result of the preliminary dithering processing is that a dot is "OFF", the predetermined value β may be subtracted to determine whether a dot is "ON" or "OFF". Even with such a configuration, increasing the value of β increases the contribution of the dithering method. At this time, it is necessary to compute the ED binarization error En without the predetermined value β so that the gradients in the image data as a whole can be accurately reflected. Of course, the predetermined value β may be given by a value that changes in accordance with the gradation value of the input pixel of interest data Dn. Even with such a configuration, the ease with which dots are formed in the error diffusion method can be favorably controlled in the same manner as when changing the threshold THe.

J. Modified Example 5

The above embodiments describe a configuration in which the entire printing processing illustrated in FIG. 2 is executed in the printer 20, in a case where the printing processing is carried out by a printing system (a broad definition of a printing apparatus) in which the printer 20 is connected to a computer, all or part of the printing processing, the halftone processing, and the like may be carried out by either the computer or the printer 20.

Although embodiments of the invention have been described thus far, constituent elements of the invention described above in the embodiments aside from the elements indicated in the independent claims are additional elements that can be omitted as desired. The invention is not limited to these embodiments, and can be carried out in a variety of forms without departing from the essential spirit of the invention. For example, the invention is not limited to a serial-type ink jet printer as described in the above embodiments, and can be applied in a variety of types of printing apparatuses, such as ink jet-type line printers, laser-type printers, and the like. In addition to being configured as a printing apparatus, the invention can be realized as a printing method, a storage apparatus storing a program within a host device that can be read by a computer, a recording medium storing a program outside a host device that can be read by a computer, an image processing apparatus, and a method of controlling an image processing apparatus.

This application claims priority under 35 U.S.C. § 119 to Japanese Patent Application No. 2018-004692, filed Jan. 16, 2018. The entire disclosure of Japanese Patent Application No. 2018-004692 is hereby incorporated herein by reference.

What is claimed is:

1. An image processing apparatus configured to print an image, the image processing apparatus comprising:
   a preliminary halftone processing unit configured to determine whether a preliminary dot through a dithering method is to be formed on the basis of a data gradation value in image data;
   a final halftone processing unit configured to determine whether a dot to be printed through an error diffusion method is to be formed on the basis of the data gradation value; and
   a dither result application level control unit configured to control a dither result application level, the dither result application level being a level at which probability that the dot to be printed will be formed is raised when the preliminary dot is formed, wherein
   the final halftone processing unit applies the dither result application level, and
   the dither result application level control unit reduces the dither result application level during printing in a case where copy data from a reflected document is used as the image data or a case where the image data contains many high-frequency components, compared to other instances of printing.

2. The image processing apparatus according to claim 1, wherein
   the dither result application level control unit includes a mechanism of using a lower error diffusion method threshold used in the error diffusion method when the preliminary dot is to be formed than when the preliminary dot is not to be formed, and reduces the dither result application level by reducing a difference between the error diffusion method threshold used in the case where the preliminary dot is to be formed, and the error diffusion method threshold used in the case where he preliminary dot is not to be formed.

3. The image processing apparatus according to claim 1, wherein
   the dither result application level control unit, in a case where the dither result application level is set to a maximum, sets a pixel, in which the preliminary dot is to be formed, to be formed with the dot to be printed with the final halftone processing unit.

4. The image processing apparatus according to claim 1, wherein
the dither result application level control unit includes a mechanism of using a lower error diffusion method threshold used in the error diffusion method when the preliminary dot is to be formed than when the preliminary dot is not to be formed, and reduces the dither result application level by reducing a difference between the error diffusion method threshold used in the case where the preliminary dot is to be formed, and the error diffusion method threshold used in the case where the preliminary dot is not to be formed, and in the case where the dither result application level is set to a maximum, sets a pixel, in which the preliminary dot is to be formed, to be formed with the dot to be printed in the final halftone processing unit.

5. The image processing apparatus according to claim 1, wherein
the dither result application level control unit controls a percentage of the preliminary dots to be formed, and when the dither result application level is reduced, reduces a percentage of pixels determined, by the preliminary halftone processing unit, to have the preliminary dot to be formed.

6. The image processing apparatus according to claim 1, wherein
the dither result application level control unit includes a mechanism of using a lower error diffusion method threshold used in the error diffusion method, when the preliminary dot is to be formed than when the preliminary dot is not to be formed, reduces the dither result application level by reducing a difference between the error diffusion method threshold used in the case where the preliminary dot is to be formed, and the error diffusion method threshold used in the case where the preliminary dot is not to be formed, and controls a percentage of the preliminary dots to be formed, and when the dither result application level is reduced, reduces a percentage of pixels determined, by the preliminary halftone processing unit, to have the preliminary dot to be formed.

7. The image processing apparatus according to claim 1, wherein
the final halftone processing unit applies the error diffusion method using a low-level threshold, the low-level threshold being the error diffusion method threshold in the case where the preliminary dot is to be formed, for a pixel in which the preliminary dot is to be formed with the preliminary halftone processing unit, and using a high-level threshold, the high-level threshold being the error diffusion method threshold in the case where the preliminary dot is not to be formed, for a pixel in which the preliminary dot is not to be formed with the preliminary halftone processing unit.

8. The image processing apparatus according to claim 1, wherein
the dither result application level control unit includes a mechanism of using a lower error diffusion method threshold used in the error diffusion method when the preliminary dot is to be formed than when the preliminary dot is not to be formed, and reduces the dither result application level by reducing a difference between the error diffusion method threshold used in the case where the preliminary dot is to be formed, and the error diffusion method threshold used in the case where the preliminary dot is not to be formed, and the final halftone processing unit applies the error diffusion method using a low-level threshold, the low-level threshold being the error diffusion method threshold in the case where the preliminary dot is to be formed, for a pixel in which the preliminary dot is to be formed with the preliminary halftone processing unit, and using a high-level threshold, the high-level threshold being the error diffusion method threshold in the case where the preliminary dot is not to be formed, for a pixel in which the preliminary dot is not to be formed with the preliminary halftone processing unit.

9. The image processing apparatus according to claim 1, wherein
the dither result application level control unit, in the case where the dither result application level is set to a maximum, sets a pixel, in which the preliminary dot is to be formed, to be formed with the dot to be printed with the final halftone processing unit, and
the final halftone processing unit applies the error diffusion method using a low-level threshold, the low-level threshold being the error diffusion method threshold in the case where the preliminary dot is to be formed, for a pixel in which the preliminary dot is to be formed with the preliminary halftone processing unit, and using a high-level threshold, the high-level threshold being the error diffusion method threshold in the case where the preliminary dot is not to be formed, for a pixel in which the preliminary dot is not to be formed with the preliminary halftone processing unit.

10. The image processing apparatus according to claim 1, wherein
the dither result application level control unit includes a high-frequency component determination unit configured to determine an amount of high-frequency components in the image data, and in the case where the high-frequency component determination unit has determined that an amount of the high-frequency components in the image data is greater than or equal to a set amount, the dither result application level is reduced compared to cases where a different determination is made.

11. The image processing apparatus according to claim 1, wherein
the dither result application level control unit includes a mechanism of using a lower error diffusion method threshold used in the error diffusion method when the preliminary dot is to be formed than when the formation of the preliminary dot is not to be formed, and reduces the dither result application level by reducing a difference between the error diffusion method threshold used in the case where the preliminary dot is to be formed, and the error diffusion method threshold used in the case where the preliminary dot is not to be formed,
the dither result application level control unit further includes a high-frequency component determination unit configured to determine an amount of high-frequency components in the image data, and in the case where the high-frequency component determination unit has determined that an amount of the high-frequency components in the image data is greater than or equal to a set amount, reduces the dither result application level compared to a case where a different determination is made.

12. The image processing apparatus according to claim 1, wherein the dither result application level control unit, in the case where the dither result application level is set to a maximum, sets a pixel, in which the preliminary dot is to be formed, to be formed with the dot to be printed with the final halftone processing unit, and the dither result application level control unit includes a high-frequency component determination unit configured to determine an amount of high-frequency components in the image data, and in the case where the high-frequency component determination unit has determined that an amount of the high-frequency components in the image data is greater than or equal to a set amount, reduces the dither result application level compared to a case where a different determination is made.

13. The image processing apparatus according to claim 1, wherein the low-level threshold of the error diffusion method threshold, during printing that is neither a case where copy data from the reflected document is used as the image data nor a case where the image data contains many high-frequency components, is a value lower than a minimum value of a gradation range of the data gradation value in all gradation ranges of the data gradation value, or a pixel in which the preliminary dot is to be formed is set to be formed with the dot to be printed with the final halftone processing unit.

14. The image processing apparatus according to claim 1, wherein the dither result application level control unit includes a mechanism of using a lower error diffusion method threshold used in the error diffusion method when the preliminary dot is to be formed than when the preliminary dot is not formed, and reduces the dither result application level by reducing a difference between the error diffusion method threshold used in the case where the preliminary dot is formed, and the error diffusion method threshold used in the case where the preliminary dot is not to be formed, and the low-level threshold of the error diffusion method threshold, during printing that is neither a case where copy data from the reflected document is used as the image data nor a case where the image data contains many high-frequency components, is a value lower than a minimum value of a gradation range of the data gradation value in all gradation ranges of the data gradation value, or a pixel in which the preliminary dot is to be formed is set to be formed with the dot to be printed with the final halftone processing unit.

15. The image processing apparatus according to claim 1, wherein the dither result application level control unit, in the case where the dither result application level is set to a maximum, sets a pixel, in which the preliminary dot is formed, to be formed with the dot to be printed with the final halftone processing unit, and the low-level threshold of the error diffusion method threshold, during printing that is neither a case where copy data from the reflected document is used as the image data nor a case where the image data contains many high-frequency components, is a value lower than a minimum value of a gradation range of the data gradation value in all gradation ranges of the data gradation value, or a pixel in which the preliminary dot is to be formed is set to be formed with the dot to be printed with the final halftone processing unit.

16. The image processing apparatus according to claim 1, wherein the low-level threshold of the error diffusion method threshold, during printing in a case where copy data from the reflected document is used as the image data or a case where the image data contains many high-frequency components, is the same value as the high-level threshold when the data gradation value is less than a predetermined value, and is a lower value than the high-level threshold when the data gradation value is greater than or equal to the predetermined value.

17. The image processing apparatus according to claim 1, wherein the dither result application level control unit includes a mechanism of using a lower error diffusion method threshold used in the error diffusion method when the preliminary dot is to be formed than when the formation of the preliminary dot is not to be formed, and reduces the dither result application level by reducing a difference between the error diffusion method threshold used in the case where the preliminary dot is to be formed, and the error diffusion method threshold used in the case where the formation of the preliminary dot is not to be formed, and the low-level threshold of the error diffusion method threshold, during printing in a case where copy data from the reflected document is used as the image data or a case where the image data contains many high-frequency components, is the same value as the high-level threshold when the data gradation value is less than a predetermined value, and is a lower value than the high-level threshold when the data gradation value is greater than or equal to the predetermined value.

18. The image processing apparatus according to claim 1, wherein the dither result application level control unit, in the case where the dither result application level is set to a maximum, sets a pixel, in which the preliminary dot is formed, to be formed with the dot to be printed with the final halftone processing unit, and the low-level threshold of the error diffusion method threshold, during printing in a case where copy data from the reflected document is used as the image data or a case where the image data contains many high-frequency components, is the same value as the high-level threshold when the data gradation value is less than a predetermined value, and is a lower value than the high-level threshold when the data gradation value is greater than or equal to the predetermined value.

19. A method of controlling an image processing apparatus configured to print an image, by using a computer, the method comprising:

carrying out preliminary halftone processing of determining whether a preliminary dot through a dithering method is to be formed on the basis of a data gradation value in image data;

carrying out final halftone processing of determining whether a dot to be printed through an error diffusion method is to be formed on the basis of the data gradation value; and controlling a dither result application level, the dither result application level being a level at which probability that the dot to be printed will be formed is raised when the preliminary dot is to be formed, wherein the final halftone processing applies the dither result application level, and the dither result application level control unit reduces the dither result application level during printing in a case where copy data from the reflected document is used as the image data or a case where the image data contains many high-frequency components, compared to other instances of printing.

20. A printing apparatus including a printing mode for printing an image and a reflective document copying mode for copying a reflected document, the printing apparatus comprising:
   a preliminary halftone processing unit configured to determine whether a preliminary dot through a dithering method is to be formed on the basis of a data gradation value in image data;
   a final halftone processing unit configured to determine whether a dot to be printed through an error diffusion method is formed on the basis of the data gradation value; and
   a dither result application level control unit configured to control a dither result application level, the dither result application level being a level at which probability that the dot to be printed will be formed is raised when the preliminary dot is formed, wherein
   the final halftone processing unit applies the dither result application level, and
   the dither result application level control unit reduces the dither result application level during printing in the case of the reflective document copying mode, compared to other instances of printing.

* * * * *